United States Patent
Harada

(10) Patent No.: US 9,110,974 B2
(45) Date of Patent: Aug. 18, 2015

(54) DISPLAY AND NAVIGATION OF STRUCTURED ELECTRONIC DOCUMENTS

(71) Applicant: Aradais Corporation, Oakland, CA (US)

(72) Inventor: Daishi Harada, Oakland, CA (US)

(73) Assignee: ARADAIS CORPORATION, Oakland, CA (US)

( * ) Notice: Subject to any disclaimer, the term of this patent is extended or adjusted under 35 U.S.C. 154(b) by 415 days.

(21) Appl. No.: 13/683,781

(22) Filed: Nov. 21, 2012

(65) Prior Publication Data

US 2014/0075286 A1 Mar. 13, 2014

Related U.S. Application Data

(60) Provisional application No. 61/698,936, filed on Sep. 10, 2012.

(51) Int. Cl.
| | | |
|---|---|---|
| G06F 17/00 | (2006.01) | |
| G06F 17/30 | (2006.01) | |
| G06F 17/21 | (2006.01) | |
| G06F 3/0488 | (2013.01) | |

(52) U.S. Cl.
CPC ...... *G06F 17/30643* (2013.01); *G06F 3/04886* (2013.01); *G06F 17/21* (2013.01); *G06F 17/211* (2013.01)

(58) Field of Classification Search
CPC . G06F 17/211; G06F 17/212; G06F 17/2241; G06F 17/30589; G06F 17/30643
USPC ........................... 715/200, 273, 234
See application file for complete search history.

(56) References Cited

U.S. PATENT DOCUMENTS

| | | | | |
|---|---|---|---|---|
| 5,146,552 | A * | 9/1992 | Cassorla et al. | 715/234 |
| 5,535,324 | A * | 7/1996 | Alvarez et al. | 715/209 |
| 6,801,910 | B1 * | 10/2004 | Bedell et al. | 1/1 |
| 7,469,381 | B2 | 12/2008 | Ording | |
| 7,786,975 | B2 | 8/2010 | Ording et al. | |
| 8,209,606 | B2 | 6/2012 | Ording | |
| 8,219,937 | B2 | 7/2012 | Coddington | |
| 8,751,923 | B2 * | 6/2014 | Nagao | 715/234 |
| 8,938,672 | B2 * | 1/2015 | Desantis et al. | 715/273 |
| 2001/0049677 | A1 * | 12/2001 | Talib et al. | 707/3 |
| 2003/0142145 | A1 * | 7/2003 | Bennett et al. | 345/853 |
| 2005/0210052 | A1 * | 9/2005 | Aldridge | 707/101 |
| 2005/0240881 | A1 * | 10/2005 | Rush et al. | 715/851 |
| 2006/0026521 | A1 | 2/2006 | Hotelling et al. | |
| 2007/0168413 | A1 * | 7/2007 | Barletta et al. | 709/203 |
| 2007/0198907 | A1 * | 8/2007 | Degala et al. | 715/500 |
| 2008/0204426 | A1 | 8/2008 | Hotelling et al. | |
| 2008/0231610 | A1 | 9/2008 | Hotelling et al. | |

(Continued)

OTHER PUBLICATIONS

Rivest et al., SOLAP: A New Type of User Interface to Support Spatio-Temporal Multidimensional Data Exploration and Analysis, Google 2003, pp. 1-8.*

*Primary Examiner* — Cong-Lac Huynh
(74) *Attorney, Agent, or Firm* — Beyer Law Group LLP

(57) ABSTRACT

A user interface display aids in the navigation between representations of different levels of detail of a structured document. A drilldown corresponds to a greater level of detail and a drillup corresponds to a reduced level of detail. A user enters an input to perform either a drilldown or a drillup. A transition animation is generated to provide contextual information to aid a user to understand that the transition in representation is being performed.

48 Claims, 26 Drawing Sheets

(56) References Cited

U.S. PATENT DOCUMENTS

| | | |
|---|---|---|
| 2008/0235563 A1* | 9/2008 | Nakamura .................... 715/200 |
| 2008/0243778 A1* | 10/2008 | Behnen et al. .................... 707/3 |
| 2009/0070704 A1 | 3/2009 | Ording |
| 2009/0070705 A1 | 3/2009 | Ording |
| 2010/0106654 A1* | 4/2010 | Simpson et al. .............. 705/300 |
| 2010/0228693 A1* | 9/2010 | Dawson et al. ................. 706/12 |
| 2010/0229116 A1* | 9/2010 | Murase et al. ................. 715/810 |
| 2010/0283743 A1 | 11/2010 | Coddington |
| 2011/0035707 A1* | 2/2011 | Kitayama ..................... 715/848 |
| 2011/0055760 A1* | 3/2011 | Drayton et al. ............... 715/834 |
| 2011/0131481 A1* | 6/2011 | Vronay et al. ................. 715/227 |
| 2012/0162251 A1* | 6/2012 | Minamino et al. ............ 345/629 |
| 2012/0303629 A1* | 11/2012 | Klein et al. ................... 707/741 |
| 2013/0275866 A1* | 10/2013 | Miller-Cushon et al. ..... 715/273 |
| 2015/0067477 A1* | 3/2015 | Whetsell et al. .............. 715/234 |

* cited by examiner

| FOODS | | |
|---|---|---|
| MEATS | FRUITS | VEGETABLES |
| BEEF | APPLE | CARROT |
| PORK | ORANGE | POTATO |
| CHICKEN | LEMON | ONION |
| FISH | BANANA | LETTUCE |

FIG. 7A

| FOODS | | |
|---|---|---|
| MEATS | FRUITS | VEGETABLES |
| BEEF | APPLE | CARROT |
| PORK | ORANGE | POTATO |
| CHICKEN | LEMON | ONION |
| FISH | BANANA | LETTUCE |

FIG. 7B

| FOODS | | |
|---|---|---|
| MEATS | FRUITS | VEGETABLES |
| BEEF | APPLE | CARROT |
| PORK | ORANGE | POTATO |
| CHICKEN | LEMON | ONION |
| FISH | BANANA | LETTUCE |

FIG. 7C

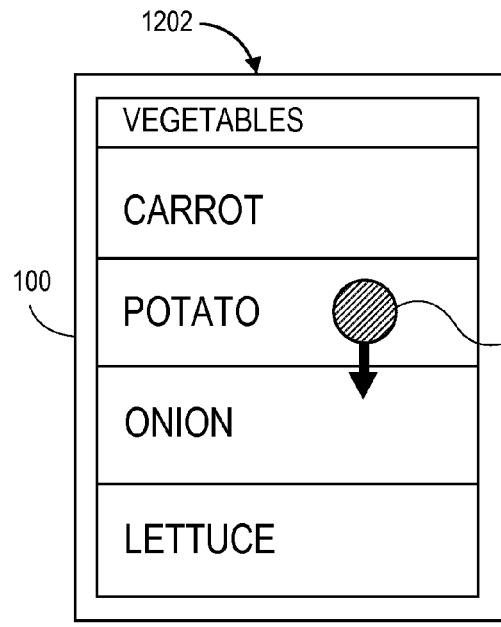
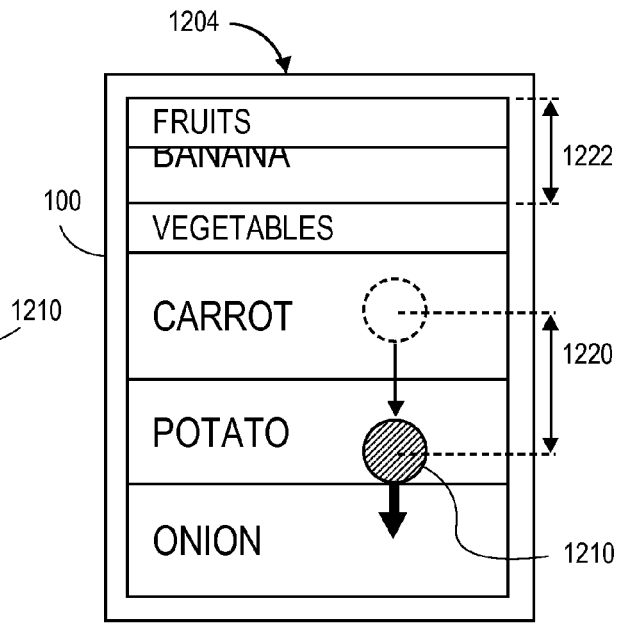
FIG. 12A  FIG. 12B
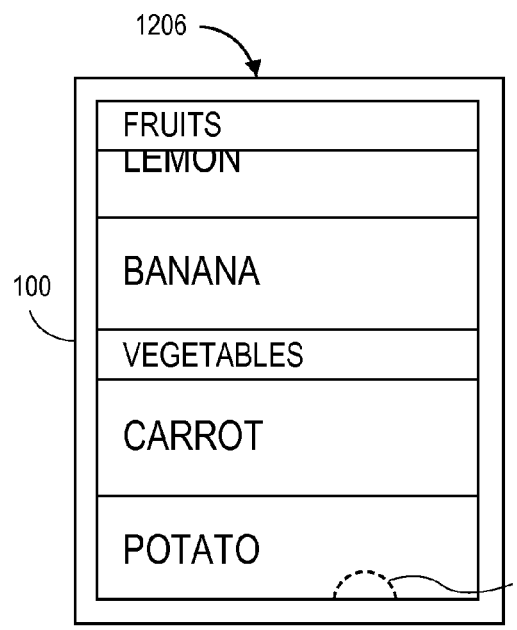
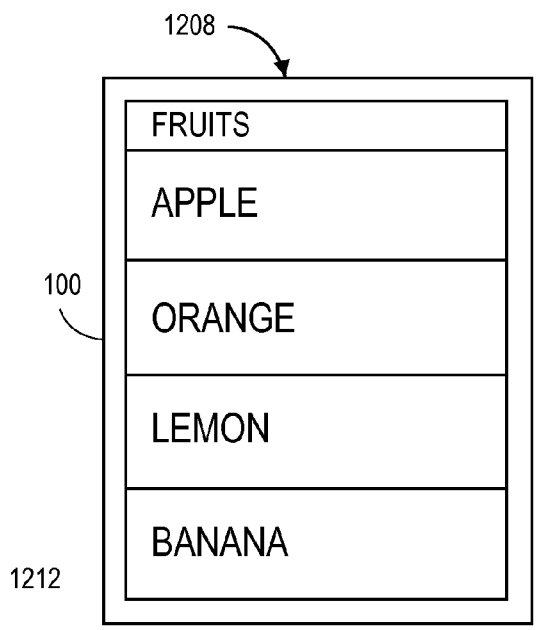
FIG. 12C  FIG. 12D

DISPLAY AND NAVIGATION OF STRUCTURED ELECTRONIC DOCUMENTS

CROSS REFERENCE TO RELATED APPLICATIONS

The present application claims the benefit of provisional application 61/698,936, filed on Sep. 10, 2012 by Daishi HARADA, entitled "Display And Navigation Of Structured Electronic Documents," the contents of which are hereby incorporated by reference.

BACKGROUND OF THE INVENTION

Computing devices may utilize graphic user interfaces to present content and allow for interaction with such presented content. As computing devices become smaller, it becomes more difficult to efficiently present content and provide intuitive mechanisms for interacting with such presented content.

A variety of compact computing devices, such as some smart phones and tablet devices, include a touch-screen display. The touch screen permits users to use gestures with an object, such as a finger, to interact with the computing device. For example, using a touch screen, the user may navigate through emails, documents, web pages, and other media. An example of such a computing device includes the iPhone® of Apple, Inc. of Cupertino, Calif., which permits users, for example, to scroll through a list of items with a swiping gesture, and to zoom in and out of a view with a pinching/depinching gesture.

However, a problem with conventional touch screen devices is that they do not provide an efficient way for a user to navigate structured documents, or media having different viewing modes or levels of detail. As one example, conventional user interfaces for touch screen devices include a "back" button to navigate to a previous viewing mode or level of detail, wasting precious screen real estate. Here, by "structured document," we mean a general store of data that has some form of organization. We will elaborate further on this in the detailed description below.

As another example, when using gestures to navigate to different viewing modes of a document, for example scrolling a list or zooming an image, conventional touch screen devices do not provide a feedback mechanism requiring the user to exert additional effort when crossing a section or other internal threshold of the document.

Additionally, existing user interfaces for touch screen devices have only limited input commands for changing view modes. As a result, there are difficulties in using conventional user interfaces to change view modes for more complex situations.

BRIEF DESCRIPTION OF THE DRAWINGS

FIGS. 7A, 7B, and 7C illustrate gestures which may correspond to navigation commands in accordance with some embodiments.

FIGS. 12A-12D are schematic views of an embodiment of a computing device displaying a scrollable view with an internal threshold.

SUMMARY OF INVENTION

Figure 1:
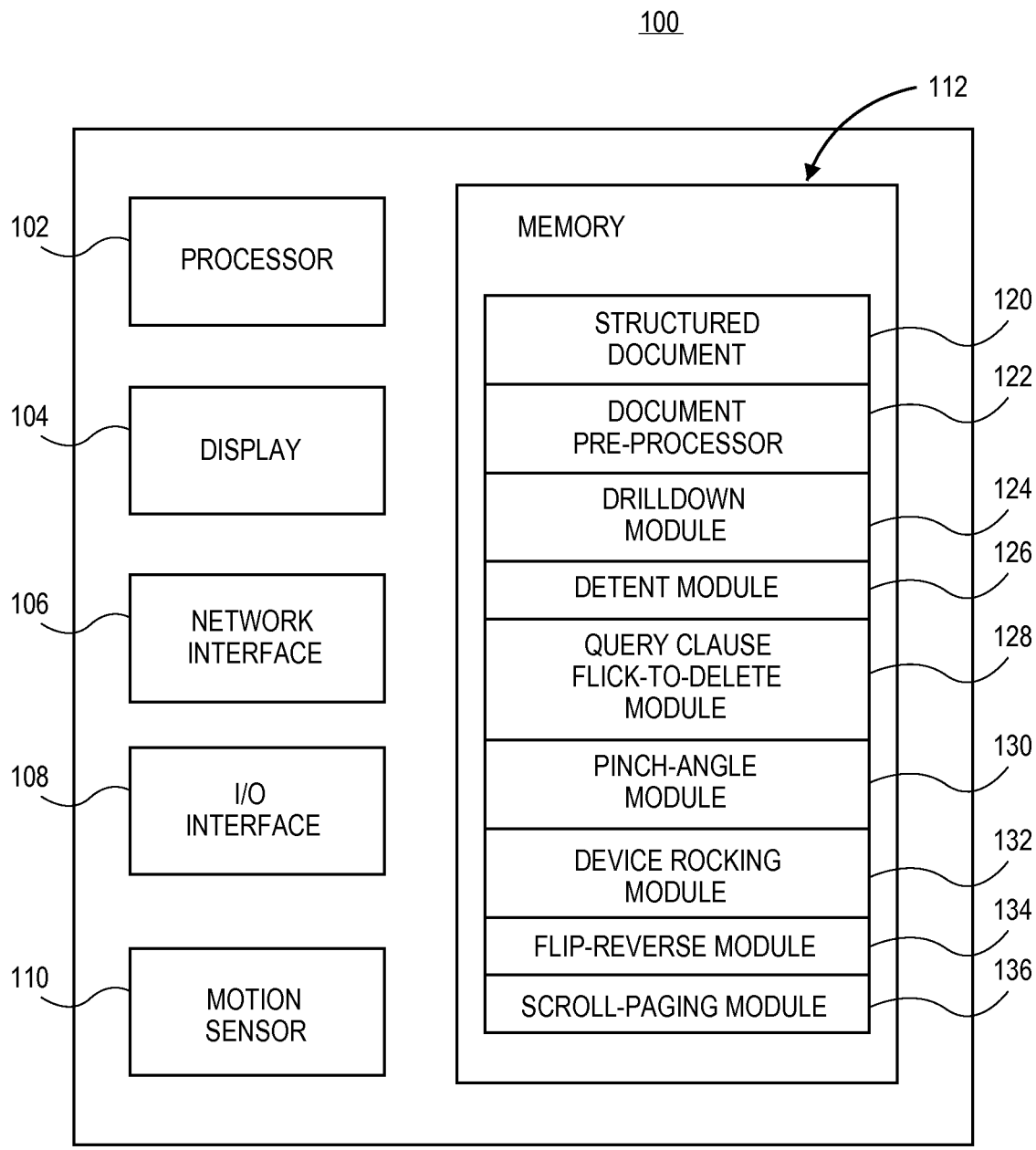
FIG. 1 is a block diagram of an embodiment of a computing device.

Systems, methods, user interfaces, and computer program products are disclosed to aid a user of a computing device in navigating structured data and other electronic documents. A structured document may include, for example, flat files or more complex file or data structures stored using a database structure. The structured document may include documents residing on a user's computing device, or documents available partially or entirely from a remote server, such as a database server, a web server, or an email server. Additionally, the document or dataset may be pre-processed to identify structures within the document, such as identifying semantic relationships or data structure relationships.

Novel techniques to assist a user in drilling down and drilling up within structured content include detecting drilldown and drillup commands to view selected information at a different level of detail, and providing sequences of transition images or other types of indicators to provide contextual information and confirmation to aid a user in understanding that a drilldown or drillup is being performed. The sequences of transition images may be part of a transition animation, which may include three dimensional images, rotation, or other features to provide contextual information to aid the viewer to form a mental association between relevant portions of two different display views at different levels of detail.

Novel techniques to aid a user to remain within a portion of a document, while still providing a possibility of navigating to different portions of the document, include a detent feature having a breakthrough resistance at a particular location in a document. A feedback mechanism permits the perceived resistance to the user to be variable. A user enters one or more gestures, such as scrolling gestures. The perceived resistance to the user depends on the gesture movement effort, over a single gesture or multiple gestures, compared with change in movement of the document or image on the display. In accordance with such an embodiment, the perceived resistance has controllable characteristics, such as a controllable variable resistance and a resistance that may have directional properties. As a result, the user may be required to exert a different level of scrolling or gesture effort when crossing a section or other internal threshold of the document until a breakthrough region is passed.

This apparent change in resistance may also be directional such that a greater resistance is encountered approaching a particular region from one direction compared to another. The resistance properties may vary abruptly in steps at particular locations but more generally a transformation function may be defined to scale the apparent resistance according to a desired function. Threshold levels of apparent resistance to break through may be set. The resistance properties may also be controlled over a selected two-dimension region between sections of a document or within individual pages of a document. Apparent variable changes in the resistance to translate, rotate, or scale specific features may also be supported, along with breakthrough detents for the translation, rotation, or scaling of specific features.

Additionally, novel techniques to navigate between viewing modes of a document are disclosed including the use of new touch screen gestures and other input techniques. The different navigation techniques may be used either alone or as part of a larger combination of approaches to aid a user to navigate structured document content efficiently and to receive confirmation that commands have been received.

Various embodiments are disclosed herein related to the display and navigation of structured and other electronic documents. In the following description, numerous specific details are set forth in order to provide a thorough understanding of the present invention. However, it will be apparent to one of ordinary skill in the art that the present invention may be practiced without these specific details.

DETAILED DESCRIPTION

FIG. 1 is a block diagram showing an embodiment of an example computing device 100. This computing device 100 may include one or more hardware and/or software components, such as processor 102, display 104, network interface 106, I/O interface 108, motion sensor 110, and memory 112. In some embodiments, the display 104 may comprise a touch sensitive display, responding to touch-based user input that may consist of one or more touches on the display. A touch on touch sensitive display may be from a finger or some other object. In some embodiments, the network interface 106 may comprise a wireless interface. In some embodiments, the motion sensor 110 may comprise an accelerometer or a gyroscope. In some embodiments, the I/O interface 108 may include components that allow the computing device 100 to receive input and provide output to components such as a keyboard, a touchpad, and/or a speaker. In some embodiments, computing device 100 may include a plurality of each of the components described herein. For example, the computing device may include both an accelerometer and a gyroscope. The processor 102 may execute instructions stored in memory 112. For example, the processor 102 may execute instructions that cause one or more of the methods described herein to be performed by computing device 100.

In some embodiments, the memory 112 may include high-speed random access memory, and may also include non-volatile memory, such as one or more magnetic disk storage devices, flash memory devices, or other non-volatile solid-state memory devices. In some embodiments, the memory 112 may store a structured document 120 described further below. In addition, in some embodiments the memory 112 may store a document pre-processor 122, a drilldown module 124, a detent module 126, a query clause flick-to-delete module 128, a pinch-angle module 130, a device rocking module 132, a flip-reverse module 134, and/or a scroll-paging module 136.

An individual computing device 100 may be sold with the various modules pre-stored in memory 112, or the user may acquire the software for the modules. In one embodiment, computer instructions for one or more of the document pre-processor 122, drilldown module 124, detent module 126, query clause flick-to-delete module 128, pinch-angle module 130, device rocking module 132, flip reverse module 134, and scroll-paging module 136 may be provided to a user of a computing device 100 via downloading from a server such as a web server. Additionally, the computer instructions for one or more of the document pre-processor 122, drilldown module 124, detent module 126, query clause flick-to-delete module 128, pinch-angle module 130, device rocking module 132, flip reverse module 134, and scroll-paging module 136 may be stored on a separate non-transitory computer readable medium, such as a CD, and provided to end-users for loading into a computing device 100.

Figure 2:
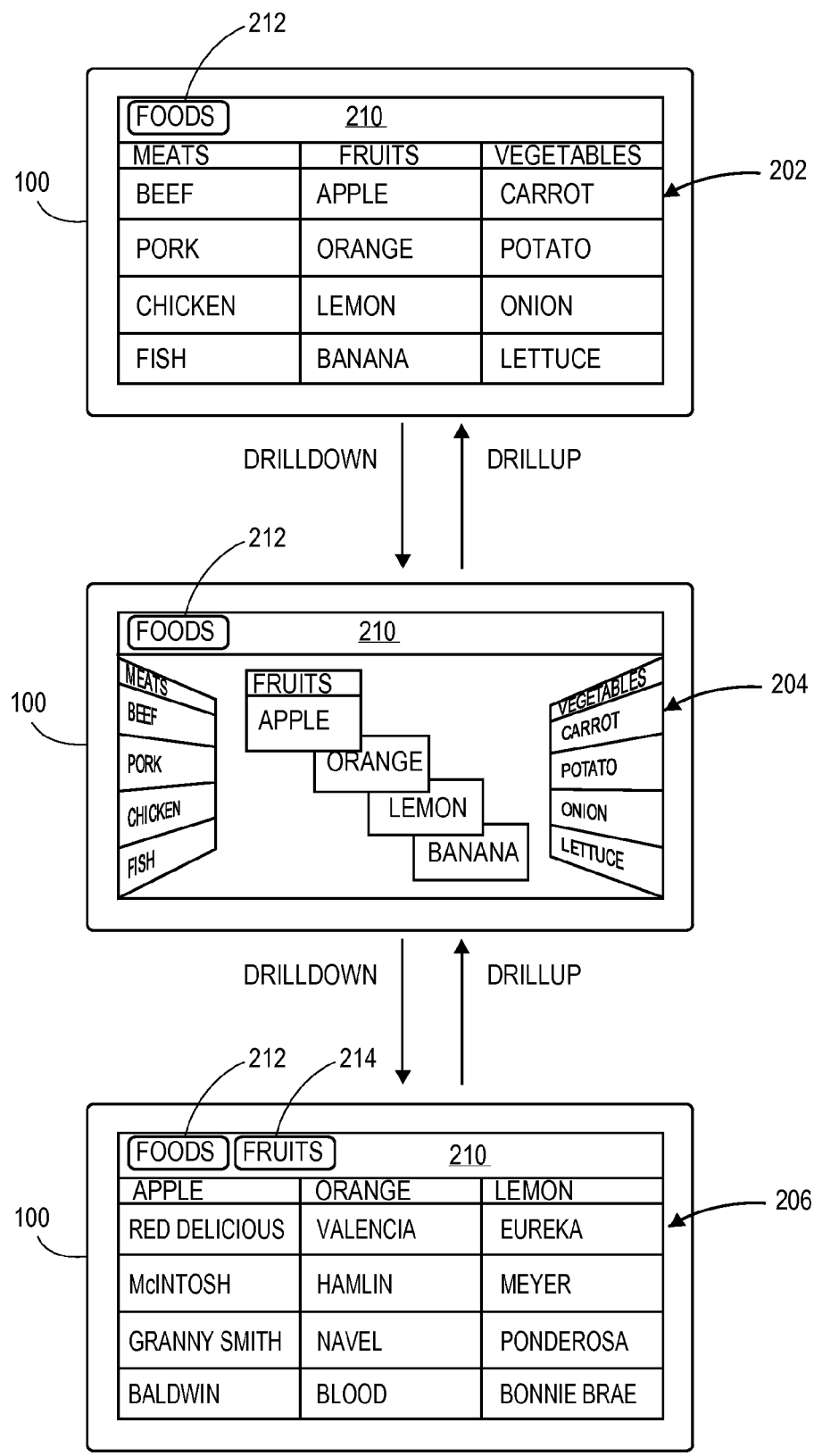
FIG. 2 is a schematic view of an embodiment of a computing device displaying a structured electronic document in two viewing modes, with an intermediate view illustrating a transition between the two viewing modes.

FIG. 2 is a schematic view of an embodiment of the computing device 100 displaying a structured electronic document in two viewing modes, with an intermediate view illustrating a transition between the two viewing modes. In this example, the structured electronic document describes a collection of foods. In some embodiments, a structured electronic document may be considered to describe a set of objects, such that in this example, the set of objects may include objects such as "Apple" and "Orange." Such objects may additionally contain annotations with labels such as "Category," where for example the "Category" annotation of the objects "Apple" and "Orange" may in both cases be "Fruit." The set of objects for which the "Category" is "Fruit" may itself be considered an object, and this object that is a set may be called "Fruits." In this case, the objects "Apple" and "Orange" may be said to be elements of the object "Fruits," and the object "Fruits" may be said to contain the objects "Apple" and "Orange." When it may enhance clarity, such objects that are elements of another object may be called sub-objects. Similarly, objects that contain other objects may be called super-objects. Note that an object such as "Apple"

may be an element of more than one super-object. For example, consider an annotation with label "Color." The object "Apple" may have a "Color" annotation that is "Red." In such a case, the object "Apple" may both be an element of the super-object "Fruit" and an element of the super-object "Red." Super-objects such as "Fruits" may themselves be elements of an object such as "Foods." In such a case, the object "Fruits" may be considered to be a sub-object with respect to "Foods." Indeed, the "Apple" object may also be a super-object containing other sub-objects such as "Red Delicious," "McIntosh," "Granny Smith," and "Baldwin."

The domain consisting of a collection of foods is used here as an example only, and many other application domains may be considered. For example, the document may apply to the domain of finance, where objects in the domain may represent companies, with sub-objects representing each company's stock price and various other properties. As another example, the document may apply to the domain of sports, where the objects in the document may represent teams and players, each with descriptions and statistics among various other properties. Similarly, to list but a few additional possible domains, the structured electronic document may comprise files on a computer, emails, books, movies, music, web pages, news items, geographic locations, or products.

In some embodiments, the structured electronic document may be stored locally on the computing device as a flat file. In some embodiments, the document may be stored partially or entirely on a remote server such as a database, where the database may be relational, OLAP, etc. Such a database may itself be stored locally or on a remote server. In some embodiments, the remote server may be a web server or an email server. When the document may be stored partially or entirely on a remote server, the computing device may query the remote server for portions of the structured electronic document as needed.

Returning to the example illustrated in FIG. 2, viewing mode 202 displays a portion of a representation of the foods in the structured electronic document in a grid where each column displays a category of foods. Each column may have a label such as "Meats," "Fruits," and "Vegetables." Such labels designate the content of their respective columns, and are not considered rows in the column. For example, "Apple," "Orange," "Lemon" and "Banana" are displayed as rows in the "Fruits" column. In this example, the horizontal direction of the grid, along which the food categories are divided, is considered the primary axis, and the vertical direction is considered the secondary axis. It is understood that this grid may be scrollable, and that not all portions of the grid may be displayed at any one time. For example, the "Fruits" column may include additional rows such as "Pineapple," "Kiwi," and "Mango" which would become visible by scrolling vertically. In addition, there may be additional columns such as "Grains" and "Dairy" which become visible by scrolling horizontally. It is further understood that the grid may or may not scroll rigidly. If the grid scrolls rigidly, then all elements of the grid scroll in unison. If the grid scrolls non-rigidly, then each column may scroll independently. It is further understood that the grid may contain any number of columns and rows, and if the number is sufficiently small such that all columns and/or rows are fully visible, then the grid may not scroll in the corresponding axis direction. It is further understood that the columns of the grid in the direction of the secondary axis may consist of an unequal number of rows, such that the grid may be considered to be staggered.

In viewing mode 202, a header 210 includes an indicator 212 labeled "Food" to indicate the scope and/or level of detail of the document displayed in the viewing mode. In viewing mode 206, the header 210 includes an additional indicator 214 labeled "Fruits" to indicate that the scope of the display is the fruits within the document. In this example, viewing mode 206 displays its portion of the document in a grid similar to viewing mode 202, displaying some cultivars of "Apple," "Orange," and "Lemon" in their respective columns. As in viewing mode 202, it is understood that this view is scrollable and that not all portions of the grid may be displayed. In particular, a column displaying the cultivars of "Banana" may be off screen to the right of the "Lemon" column. It should be noted that although in this example, the columns in viewing mode 206 contain rows of the cultivars of their respective fruits, this is not necessary. For example, the "Apple" column may alternatively consist of a single text view containing a description of apples, e.g. "An apple is a widely cultivated tree fruit that is typically red . . . ."

A correspondence between the rows in the "Fruits" column of viewing mode 202 and the columns of viewing mode 206 may be considered, where the "Orange" row in the "Fruits" column of viewing mode 202 corresponds to the "Orange" column in viewing mode 206, and similarly, for the "Apple" and "Lemon" rows. Given such a correspondence, a transition animation from viewing mode 202 to viewing mode 206 may be animated and have at least one intermediate frame, an intermediate view 204. That is, the animation includes at least one intermediate frame, but more generally, includes a sequence of frames. In this example, the "Apple" row, having a source position and size within the "Fruits" column of viewing mode 202 animates by translating its position and scaling its size to match the "Apple" column, having a target position and size in viewing mode 206. Note that the source or target positions may be partially or wholly off screen, and that the positions are determined by the grid of the viewing mode. In particular, the "Orange" and "Lemon" rows within the "Fruits" column of viewing mode 202 animates similarly to the "Apple" row, as does the "Banana" row, except that in the "Banana" case, the target position is off screen to the right of the "Lemon" column. In combination, the animation of the rows in the "Fruits" column in viewing mode 202 may be considered to be a "rotation" of the rows into the corresponding position of the columns in viewing mode 206. The column that rotates in this manner, the "Fruits" column in this example, may be called the selected column.

As each source row in the "Fruits" column of viewing mode 202 transforms its geometry to its target column in viewing mode 206, the content display of the source row may be animated to transition to the content display of the target column, for example by alpha-blending the contents. Alternative transition animations will be illustrated in subsequent figures.

The "Meat" and "Vegetables" columns in viewing mode 202 may animate by translating laterally away from the "Fruits" column to make room for the rotation of the selected column. As illustrated in intermediate view 204, in addition to the translation, the "Meat" and "Vegetable" columns may rotate using a pseudo-3D perspective view to enhance the visual effect of the movement. Note that here and elsewhere the use of 3D or pseudo-3D views in the examples is entirely optional.

A transition such as the one from a source viewing mode 202 to a target viewing mode 206 as described above, in which a greater level of detail is displayed by rotating the rows of a column of a source grid to form the columns of a target grid may be called a "drilldown." The reverse transition, such as the one where the viewing mode 206 is the source and the viewing mode 202 is the target in which a reduced level of detail is displayed, may be called a "drillup."

The drilldown rotation direction is substantially opposite to that of the drillup rotation duration. In this example, the drilldown rotation direction is counter-clockwise, and the drillup rotation direction is clockwise. The rotation is substantial in that the rotation is enough to clearly demonstrate to a viewer that a transition is occurring.

The rotation of the drilldown transition from viewing mode 202 to viewing mode 206 illustrated in FIG. 2 may be considered to be centered around the "Orange" row in the "Fruits" column in viewing mode 202, in that the corresponding "Orange" column is centered within the visible region in viewing mode 206. Note that this centering may be approximate. For example, in a viewing mode similar to that of viewing mode 206 except that the visible region contains an even number of columns, then the "Orange" column may be offset horizontally within the visible region. Similarly, the drillup transition from viewing mode 206 to viewing mode 202 may be considered to be centered around the "Orange" column in viewing mode 206.

In some embodiments, some rows in the selected column may be inserted, deleted, or reordered during the drilldown transition. Such insertions, deletions, or re-orderings may be animated in a drilldown transition by, for example, having a newly inserted row gradually appear during the transition.

Figure 3:
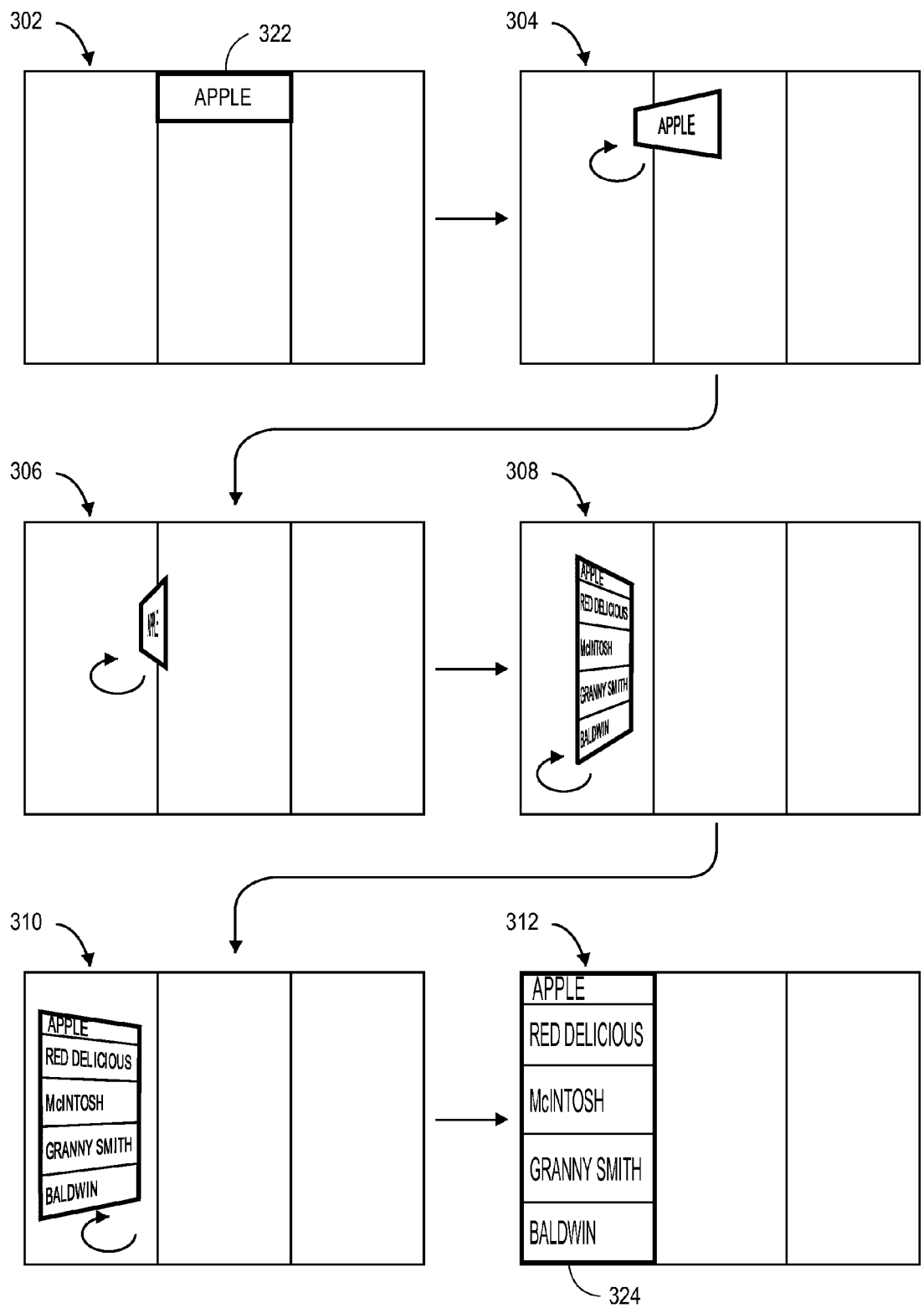
FIG. 3 illustrates an animation for transitioning between two portions of a structured electronic document in accordance with some embodiments.
Figure 4:
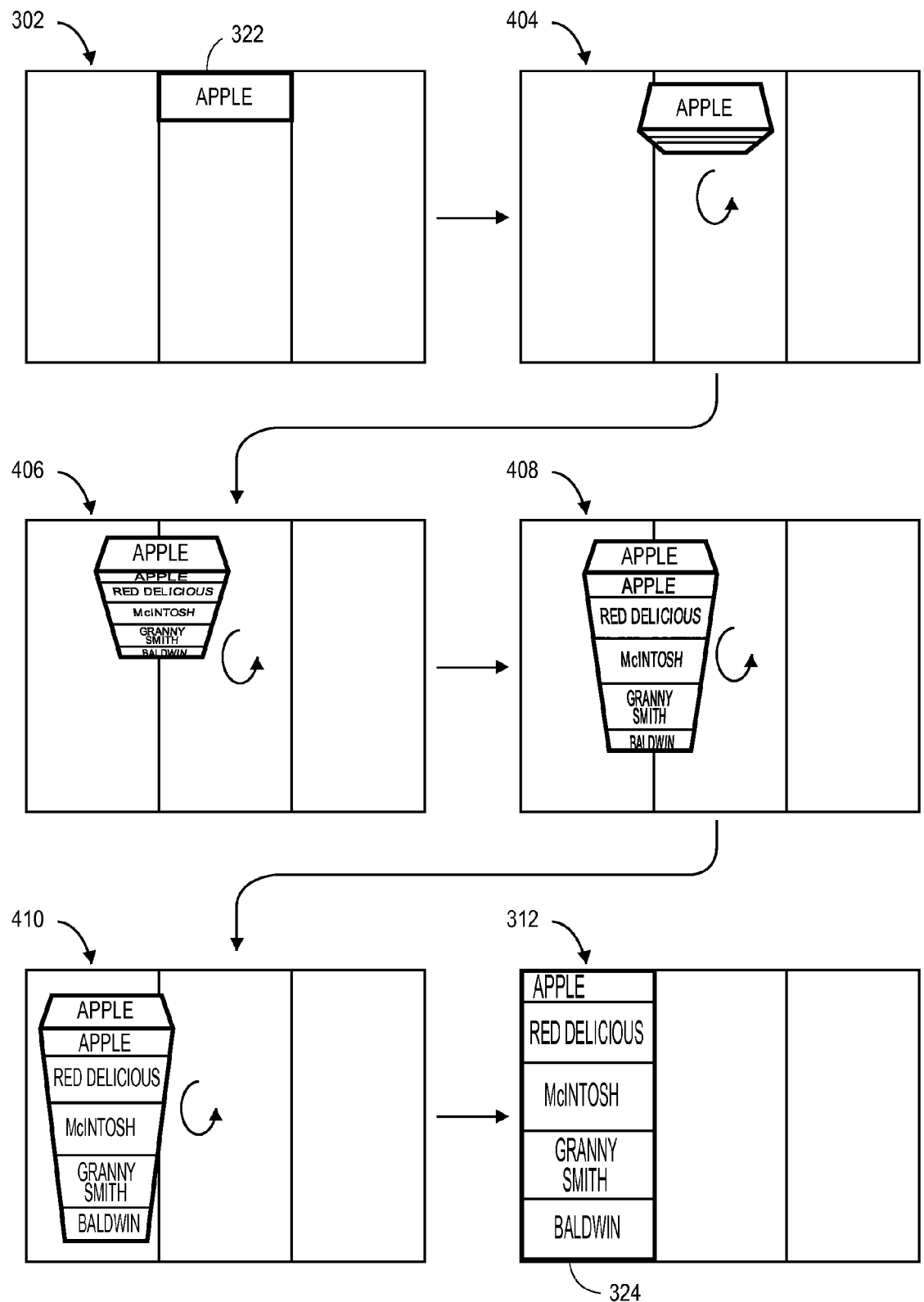
FIG. 4 illustrates another animation for transitioning between two portions of a structured electronic document in accordance with some embodiments.

FIGS. 3 and 4 illustrate two alternative drilldown transition animations. In both cases, we focus on the animation of the "Apple" row in the "Fruits" column in viewing mode 202 transitioning to the "Apple" column in viewing mode 206. Both figures are illustrated utilizing a pseudo-3D perspective view to enhance the visual appeal of their respective transitions. Both also depict, in addition to the transitions described below, the animated objects moving "backwards" away from the screen for the first half of their respective transitions, and moving back "forwards" to the original "depth" for the second half of their respective transitions. Such effects may be used in some embodiments to enhance the visual appeal of the transition, but are optional.

In FIG. 3, an initial state 302 corresponds to the viewing mode 202, with all details not shown except for the "Apple" row 322 in the "Fruits" column, to avoid distracting from the animation of the "Apple" row. A final state 312 similarly corresponds to viewing mode 206 with all details not shown except for the "Apple" column 324. The transition animation illustrated in FIG. 3 may be called a "page turn" transition. In this transition animation, the content display of the "Apple" row 322 and the content display of the "Apple" column 324 may be considered to be "back to back" or on opposite sides of a single sheet of paper, with appropriate scaling so that they are of the same size. As illustrated in intermediate frames 304-310, this transition animation depicts rotating this sheet of paper along a vertical axis as if this sheet of paper was being turned over. It should be noted that as the page turns, the height and width of the page is smoothly varied so that the initial height and width matches that of the "Apple" row 322, while the final height and width matches that of the "Apple" column 324. It may be understood that a similar transition animation may be applied to other rows besides the "Apple" row illustrated.

In FIG. 4, the initial state 302, final state 312, "Apple" row 322 and "Apple" column 324 are as described above in FIG. 3. The transition animation illustrated in FIG. 4 may be called a "box flip" transition. In this transition animation, the content display of the "Apple" row 322 and the content display of the "Apple" column 324 may be considered to be on two adjacent faces of a 3-dimensional box. Initially, the face of the box displaying the content display of the "Apple" row 322 is "face-up" and all that is visible. During the animation, the box rotates ("flips") around a horizontal axis to reveal the side displaying the content display of the "Apple" column 324, ending the transition in a final state where the face of the box displaying "Apple" column 324 is "face-up" and all that is visible. This transition animation is illustrated in intermediate frames 404-410. If, as illustrated, the widths of the content display of the "Apple" row 322 and the content display of the "Apple" column 324 are equal, then no additional scaling of the content displays beyond that implicit in the pseudo-3D perspective view is necessary to achieve a smooth transition for the "box flip" transition. If the widths of the content displays are not equal, then a smooth variation in the scale of the box width may be utilized to ensure a seamless transition. Again, it may be understood that a similar transition animation may be applied to other rows besides the "Apple" row illustrated.

An equivalent alternative "page turn" and "box flip" transition animation for the drillup case may be achieved by reversing the transition animations described above for the drilldown case. The "page turn" and "box flip" transition animations are examples of transition animations that may be utilized in some embodiments to enhance the visual appeal of a drilldown or drillup transition, while also providing the user with an enhanced contextual awareness of the manner in which the drilldown or drillup navigation operation may have updated the viewing mode of a structured electronic document. It will be apparent to one of ordinary skill in the art that alternative transition animations may be utilized in other embodiments.

Figure 5:
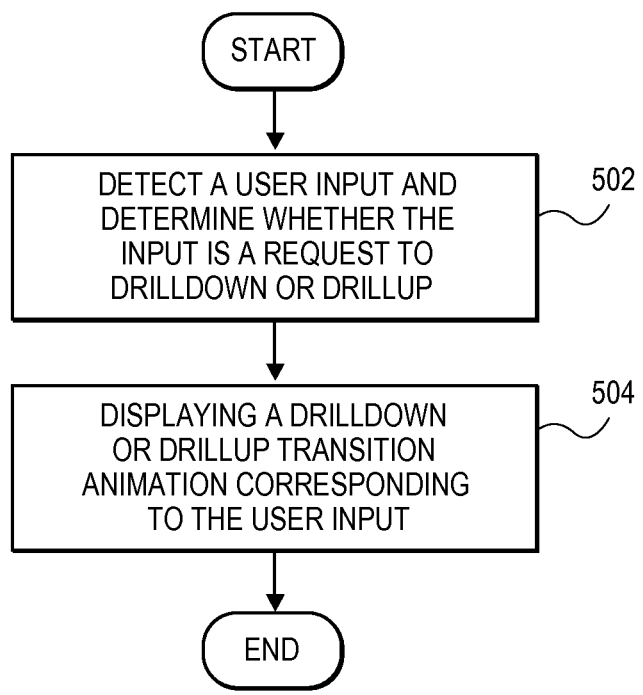
FIG. 5 is a flowchart illustrating an embodiment of a method for navigating a structured electronic document.

Having described some drilldown and drillup transitions, we turn now to describing a method for utilizing these transitions. FIG. 5 is a flowchart illustrating an embodiment of a method 500 for navigating a structured electronic document using drilldown and drillup transitions. At 502, the method 500 may comprise of detecting a user input that may correspond to a drilldown or drillup command, and may determine whether the user input corresponds to a request to drilldown or drillup. For example, the user input may be a gesture on a touch-screen display. Then, based on the determination at 502, the method 500 at 504 may display a drilldown or drillup transition animation. Such a drilldown or drillup transition animation may, for example, as was described for FIG. 2, provide contextual cues to the user regarding a change in viewing mode from viewing mode 202 to viewing mode 206 corresponding to a change in level of detail (in the case of a drilldown, and vice versa, in the case of a drillup).

Figure 6:
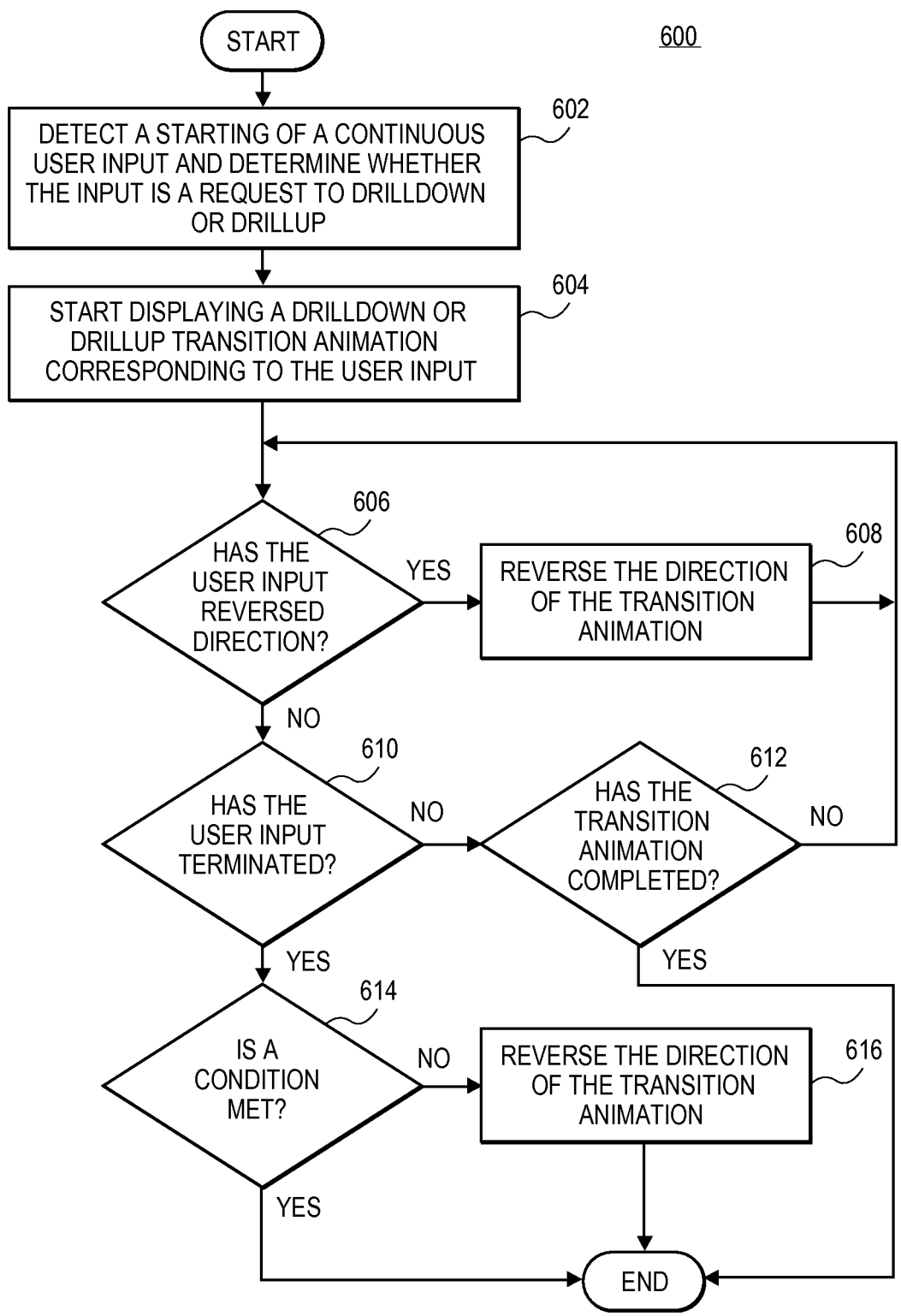
FIG. 6 is a flowchart illustrating another embodiment of a method for navigating a structured electronic document.

FIG. 6 is a flowchart illustrating an embodiment of another method 600 for navigating a structured electronic document using drilldown and drillup transitions. At 602, the method 600 may detect a starting of a continuous user input, and may determine whether the user input is a request to drilldown or drillup. At 604, based on the determination at 602, the method 600 may start displaying a drilldown or drillup transition animation. Then, at 606, the method 600 may optionally determine whether the user input has reversed direction. Examples of situations in which the user input may be considered to have reversed direction will be provided further below when gestures are described that may correspond to requests to drilldown or drillup. If the answer at 606 is yes, then the method 600 may reverse the direction of the animation transition and return to 606. If the answer at 606 is no, then the method 600 may at 610 determine whether the continuous user input has terminated. If the answer at 610 is no, then at 612 the method 600 may determine whether the transition animation has completed. If the answer at 612 is no, then the method 600 may return to 606. If the answer at 612 is yes, then the method 600 may end. If the answer at 610 is yes, then at 614, the method 600 may determine whether a condition is met. For example, this condition may be whether the gesture has crossed a certain threshold. If the answer in 614 is no, then the method 600 at 616 may reverse the direction of the transition animation before ending. If instead, the answer in 614 is yes, then the method 600 may simply end. These two example of control flowcharts are but two embodiments of this invention, and one of ordinary skill in the art would recognize an entire family of possible control flowcharts that enable a user to utilize drilldown and drillup transitions, or navigate a structured document.

We now turn to specific gestures that may correspond to a drilldown command in accordance with some embodiments. FIGS. 7A, 7B, and 7C illustrate such gestures. In these figures, the viewing mode 202 is as was described above for FIG. 2, and each illustrates a gesture that may correspond to a command to execute a drilldown transition from viewing mode 202 to viewing mode 206. FIG. 7A illustrates a discrete tap gesture 702 on the "Orange" row of the "Fruits" column. This gesture may center the rotation of the drilldown transition around the "Orange" row of the "Fruits" column since the tap gesture 702 was on this row. FIG. 7B illustrates a continuous rotation gesture with touches 704A and 704B in the drilldown rotation direction. Note that both touches of this gesture originate within the "Fruits" column of viewing mode 202. If both touches do not originate with the same column of viewing mode 202, then the rotation gesture may be considered to not correspond to a drilldown command. The drilldown transition for the gesture 704A-B may be centered around the "Orange" row of the "Fruits" column, since the point which is the middle of the two points where the two touches in the gesture originated, lie within the "Orange" row. FIG. 7C illustrates a continuous single-touch gesture that curves in the drilldown rotation direction. This gesture may correspond to a command for a drilldown transition centered around the "Orange" row of the "Fruits" column, since the single touch of the gesture originates within the "Orange" row. In each of these cases, we may say that the row around which the drilldown rotation may occur, the "Orange" row in these examples, is the selected row within the selected "Fruits" column.

Figure 8A:
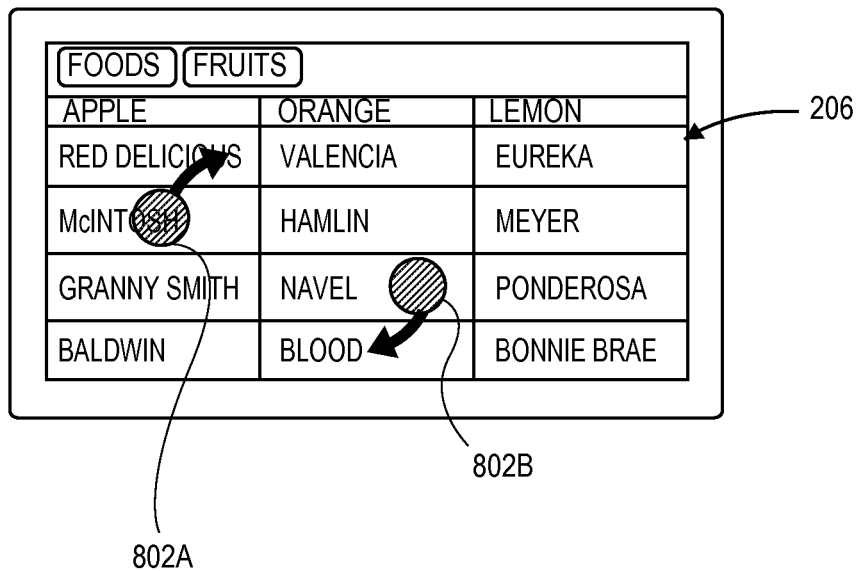
FIGS. 8A and 8B illustrate additional gestures which may correspond to navigation commands in accordance with some embodiments.
Figure 8B:
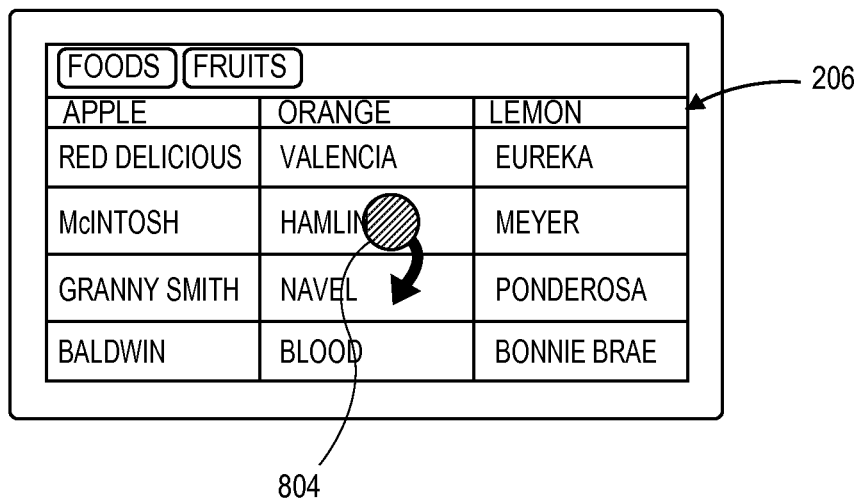

Similarly, FIGS. 8A and 8B illustrate specific gestures that may correspond to a drillup command. In these figures, the viewing mode 206 is as was described above for FIG. 2, and each illustrates a gesture that may correspond to a command to execute a drillup transition from viewing mode 206 to viewing mode 202. FIG. 8A illustrates a continuous rotation gesture with touches 802A and 802B in the drillup rotation direction. In contrast to the drilldown case, note that this rotation gesture may have touches which originate in distinct columns. The point that is in the middle of the two points, where the two touches in the gesture originated, may be the point around which a drillup is centered. In this example, this middle point lies within the "Orange" column in viewing mode 206 such that the drillup gesture may be centered around the "Orange" column. FIG. 8B illustrates a continuous single-touch gesture that curves in the drillup rotation direction. This gesture may correspond to a command for a drillup transition centered around the "Orange" column in viewing mode 206, since the single touch of the gesture originates within the "Orange" column. As in the drilldown case above, we may say that the column around which the drillup rotation may occur (the "Orange" column in these examples) is the selected column.

In general, a drilldown transition may be centered around the selected row, and similarly, a drillup transition may be centered around the selected column. However, in some embodiments this may not always be the case. For example, suppose that in the viewing mode 202 there are no rows above the "Apple" row in the "Fruits" column. In this case, if one were to consider a drilldown rotation centered around the "Apple" row, a target viewing mode (not illustrated but similar to viewing mode 206) may include an "Apple" column in the center, with a blank column to the left. Such a blank column would waste precious screen real estate. To avoid such waste, a drilldown gesture which selected the "Apple" row may optionally center the drilldown rotation around the "Orange" row. Similarly, a drillup transition may optionally center the drillup rotation around a column which is not the selected column.

Note that the gestures illustrated in FIG. 7B and FIG. 8A may be considered to be the reverse of other. Similarly, the gestures in FIG. 7C and FIG. 8B may be considered to be the reverse of the other. In both cases, a user may start one gesture, but may reverse the gesture into the other. In such a case, returning to FIG. 6, the optional 606 of method 600 may determine that a reversal has occurred, and in 608 may reverse the direction of the transition. Note also that for continuous gestures, the transition animation may or may not track the gesture. If the transition tracks the gesture, the animated rotation of the transition may correspond to the movement of the touches within the gesture. In such a case, if the transition rotation tracks reversals in the gesture, 606 may be considered to be not optional.

Although we have described in detail gestures on a touchscreen display which may be used to control a drilldown or drillup transition, it will be apparent to one of ordinary skill in the art, that other forms of user input to control a drilldown or drillup transition may be utilized in some embodiments. For example, on a device comprising a voice recognition component, the user may utter the phrase "drilldown to the orange row in the fruits column" to initiate a drilldown transition. Alternatively, on a device additionally comprising a means of tracking the user's eyes such that the point of the user's visual focus may be determined, it may suffice for the user to simply utter the phrase "drilldown" to initiate a drilldown transition, where the selected row and column of the drilldown may be determined by the point of the user's visual focus. Similarly, on a device with a means of detecting a user gesture not necessarily on a touch-screen, such as through various motion sensors or through a camera, a user may control a drilldown or drillup transition through a physical gesture not on the touchscreen. Such alternatives may be used individually or in combination.

Figure 9:
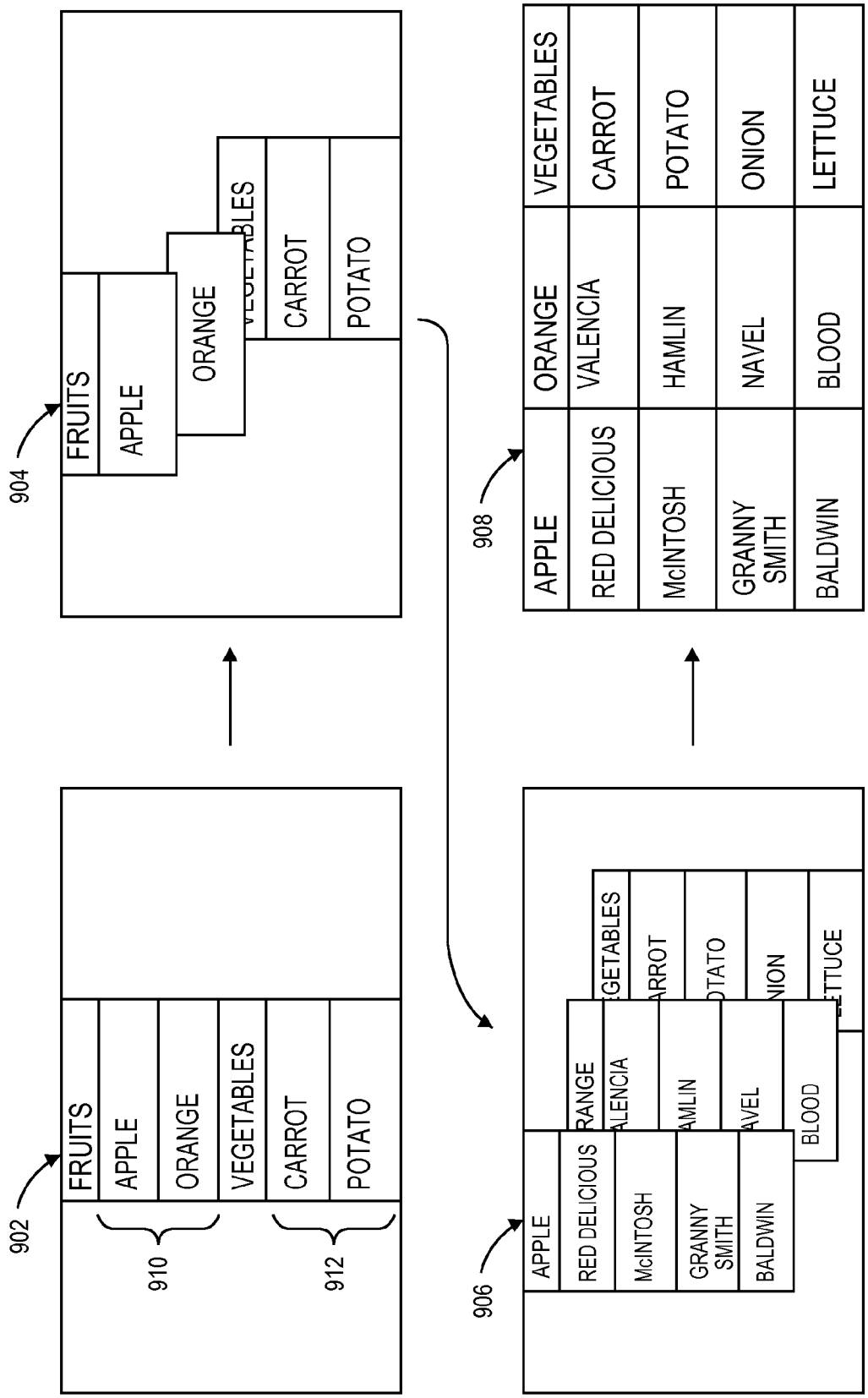
FIG. 9 illustrates a transition between two viewing modes distinct from that illustrated in FIG. 2 in accordance with some embodiments.

FIG. 9 illustrates an alternative drilldown transition from that illustrated in FIG. 2. As in FIGS. 3 and 4 we have omitted some of the ancillary surrounding details from the illustration. FIG. 9 contains a viewing mode 902 which may be understood to be part of the display of a computing device 100 as in FIG. 2, although this device is not illustrated in FIG. 9. The viewing mode 902, like viewing mode 202, displays a portion of a structured electronic document in a grid, but differs from viewing mode 202 in that viewing mode 902 has a central column containing foods from multiple categories. This central column consists of a "Fruits" section 910 with visible rows "Apple" and "Orange," and a "Vegetable" section 912 with visible rows "Carrot" and "Potato." In this example, this central column is the selected column of the drilldown transition. As with viewing mode 202, this grid in viewing mode 902 may be understood to be scrollable in both horizontal and vertical directions. Viewing mode 908 is a viewing mode with columns "Apple," "Orange," and "Vegetables." This viewing mode 908 may be a target viewing mode for an alternative drilldown transition as illustrated in FIG. 9.

Whereas in the drilldown transition illustrated in FIG. 2, there was a correspondence between each row within the selected column to a column in the target viewing mode, in the example illustrated in FIG. 9, this is not the case. In FIG. 9, the rows in the "Fruits" section 910 do correspond to columns in viewing mode 908, but the entire "Vegetable" section 912 corresponds to the "Vegetable" column in viewing mode 908. Possible intermediate animation frames in a transition from viewing mode 902 to viewing mode 908 are illustrated in intermediate frames 904 and 906. Note that as the section 912 moves to target position of the "Vegetables" column in viewing mode 908 additional rows which may have been previously off-screen in viewing mode 902 may become visible. Although frames 904 and 906 illustrate only a translation and scaling of the animated elements in the transition, alternative transition animations such as those illustrated in FIG. 3 and FIG. 4 may also be applied to the transition in FIG. 9. Such alternatives as illustrated in FIG. 3 and FIG. 4 may also be selectively applied such that these alternative transition animations are only used with the rows in the "Fruits" section 910, while the transition animation of the "Vegetable" section 912 is simply a translation.

Figure 10:
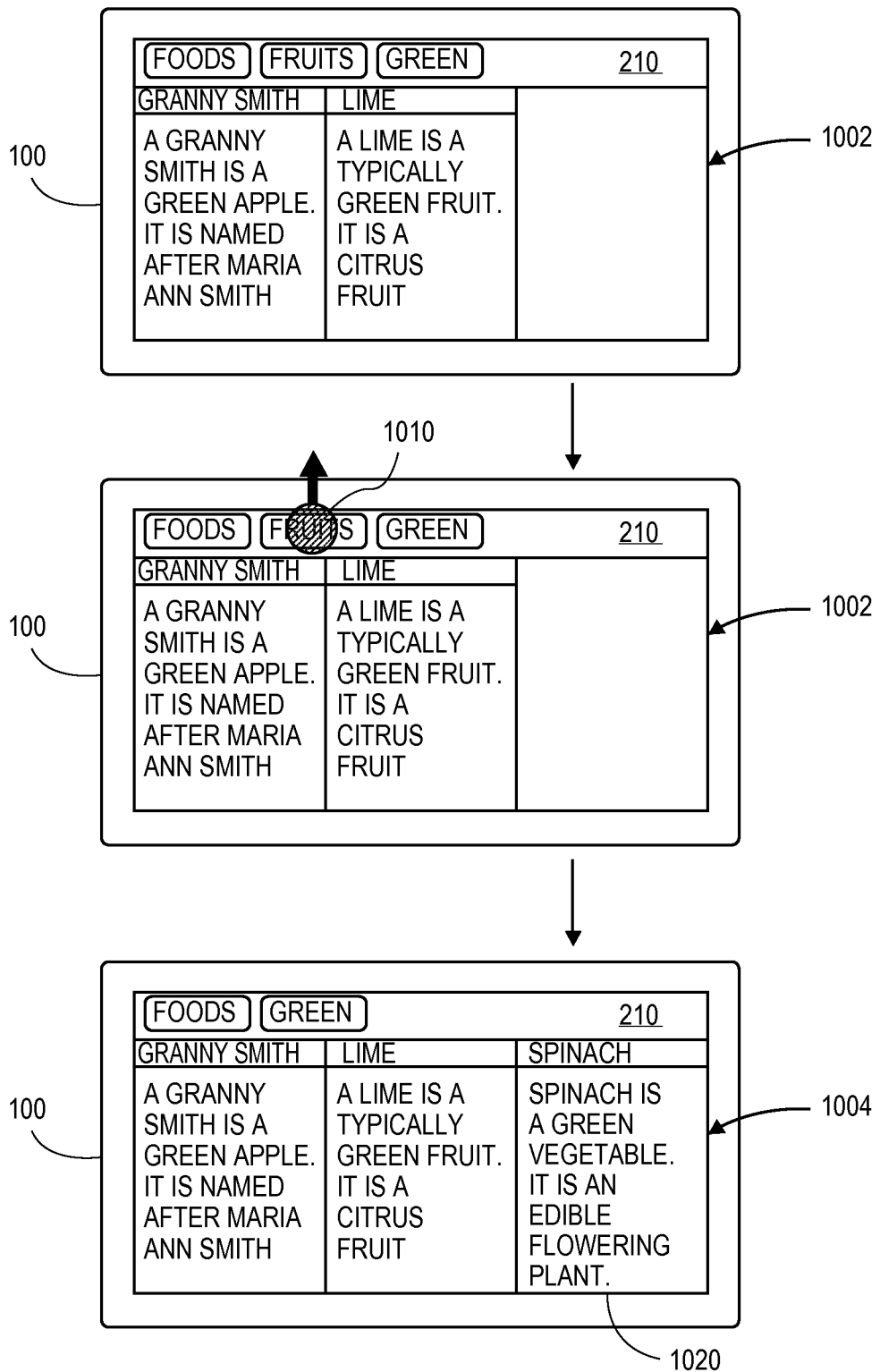
FIG. 10 is a schematic view of an embodiment of a computing device displaying a structured electronic document in two viewing modes with an additional illustration depicting a gesture which may be used to navigate from one viewing mode to the other.

The drilldown and drillup mechanisms described above provide a user with a method for navigating between two adjacent levels of detail. We now describe a mechanism by which a user may navigate between two levels of detail that may not be adjacent. FIG. 10 is a schematic view of an embodiment of the computing device 100 displaying a structured electronic document in two viewing modes 1002 and 1004. In this example, these two viewing modes are similar to viewing mode 202 in that they display a portion of a structured electronic document in a grid. As in viewing mode 202, there is a header 210 that contains indicators indicating the portion and/or level of detail of the structured electronic document represented in the grid. In viewing mode 1002, the indicators are "Foods," "Fruits," and "Green." On the other hand, in viewing mode 1004, the indicators are instead just "Foods" and "Green." Viewing modes 1002 and 1004 differ from viewing mode 202 in that each column in viewing modes 1002 and 1004 contain only a single row which contains text describing the food designated in the column label. In viewing mode 1002, the foods that are fruits and green contained within the structured electronic document, which are in this example assumed to be "Granny Smith" and "Lime," may be displayed as columns. An upward swipe gesture 1010 over an indicator, the "Fruits" indicator in this example, may remove the indicator. After this removal, the viewing mode 1004 may be displayed, which displays as columns the foods that are green (i.e., and that are no longer restricted to fruits) within the structured electronic document. In this example, this adds a "Spinach" column 1020 to the display.

More generally, the example of FIG. 10 may be seen as displaying portions or clauses of a query in a header, and displaying the results of applying this query on some data set in some other portion of the display. In some embodiments, such a query may be a database query, and the results may be obtained by executing the query on a database. In some embodiments the query may be an email filter, and the results may be obtained by executing the filter on an email server.

Figure 11:
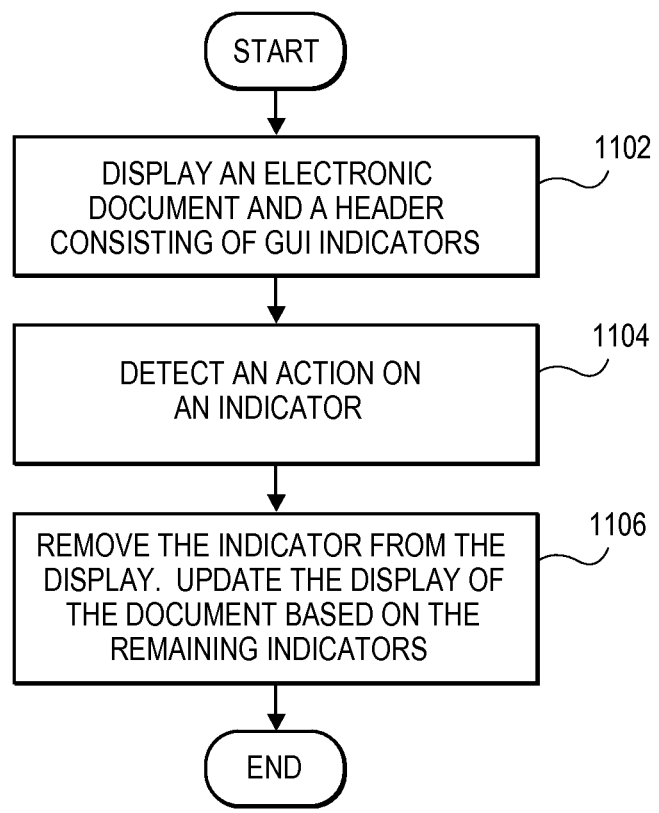
FIG. 11 is a flowchart illustrating an embodiment of a method for updating a viewing mode.

FIG. 11 is a flowchart illustrating an embodiment of a method 110 which may enable the change illustrated in FIG. 10. In 1102, the method 1100 displays a document with a header containing graphical user interface indicators. In 1104, the method detects a gesture on an indicator. In 1106, the method removes the indicator from the display and updates the display of the document to reflect the indicators remaining in the header.

We now turn to a description of a different mechanism for navigating content using a "detent." In conventional touch-screen devices, when a user uses a gesture on the touch-screen to control the viewing mode of a document, the changes or updates to the viewing mode are generally such to simulate and create an illusion for the user of directly manipulating a physical object. For example, when scrolling with a dragging gesture, the movement of the viewing mode may substantially correspond to the movement of the object such as a finger of the gesture. In this way, the user is provided with a precise and intuitive mechanism for controlling the viewing mode. Similarly, for example, in conventional touch-screen devices for rotation and zooming of a viewing mode, the updates to the viewing mode may substantially correspond to the movement of the objects such as fingers in a rotation and pinching/de-pinching gesture, respectively. That is, eventually, there is a direct correspondence between the range of motion of the finger movement and updates to the viewing mode. However, there may be contexts in which having the updates to the viewing mode not substantially correspond to the movement of the object(s) in a gesture, provides useful feedback to the user. For example, the updates to the viewing mode may be scaled down with respect to the movement of the object(s) in a gesture to simulate a change in resistance. Such resistance may be used to indicate a threshold within a document, simulating a physical detent. A detent may be used to provide an intuitive mechanism for separating subsections or particular viewing modes of a document from others, where there is some resistance to moving away from a subsection, but with sufficient "effort," the user may do so. We elaborate upon and describe in further detail these ideas below.

FIGS. 12A-12D is a schematic view of an embodiment of the computing device 100 displaying a structured electronic document in viewing modes 1202-1208. Note that in this example, the computing device 100 is oriented in a portrait orientation. Also note that for simplicity in FIGS. 12A-12D, we have not illustrated a header such as the header 210 in FIG. 2, but such a header may be included is some embodiments. In FIG. 12A, a viewing mode 1202 is illustrated which displays a portion of a structured electronic document listing foods in two categories "Fruits" and "Vegetables" similar to that described in FIG. 9. In viewing mode 1202 only the "Vegetables" section is visible, with rows for "Carrot," "Potato," "Onion," and "Lettuce" visible. In this example, it may be assumed that there is a "Fruits" section containing rows for "Apple," "Orange," "Lemon," and "Banana" off-screen above the "Vegetables" section. Now, in a conventional scrollable view, a downward dragging gesture 1210 may reveal a bottom-most row in the "Fruits" section, "Banana" in this example, where the motion of the view corresponds to the motion of the gesture. However, in this example, suppose that there is an invisible threshold between the "Vegetable" section and the "Fruits" section. Such an invisible threshold may be called a detent. In the case where a detent exists between the "Vegetable" section and the "Fruit" section, the view may move in response to a gesture 1210, but with resistance such that the movement of the view is less than the movement of the gesture that would occur ordinarily. This situation is illustrated in FIG. 12B. In a viewing mode 1204, with respect to viewing mode 1202, the view may have moved downwards by a distance 1222, which is less than a distance 1220 moved by the gesture 1210. Now, there may be a second "breakthrough" threshold for the detent such that, once the distance of the movement 1222 is greater than this break-through threshold, the gesture may "break through" the detent. Once a gesture has broken through the detent, the movement of the view may again correspond to the ordinary movement of the gesture. If the gesture terminates prior to movement 1222 reaching this second threshold, the view may reverse back to viewing mode 1202. Such a reversal may be seen as the view "snapping" back to the viewing mode 1202.

FIG. 12C illustrates a viewing mode 1206 which may follow from viewing mode 1204 after the gesture 1210 may have broken through the detent. A position 1212 in the viewing mode 1206 may indicate a location where the gesture 1210 may have terminated. Upon termination of the gesture 1210, or, optionally, even prior to the termination of the gesture, after having broken through the detent from the "Vegetable" section to the "Fruits" section, the view may scroll to a viewing mode 1208 illustrated in FIG. 12D where only the "Fruits" section is visible, so that the detent threshold is at the boundary of the visible area. In the case where this scrolling occurs prior to the termination of the gesture, subsequent movement of the user gesture may be ignored.

A scrollable view such as that illustrated in FIGS. 12A-12D may, after a swiping gesture terminates, continue to scroll for some duration as if through simulated momentum with associated damping due to simulated friction. If a detent threshold is reached during such scrolling through simulated momentum, the view may "bounce" to temporarily reveal a portion of the view past the detent threshold, but then may come to a rest where the detent threshold lies at a boundary of the visible area.

Figure 13A:
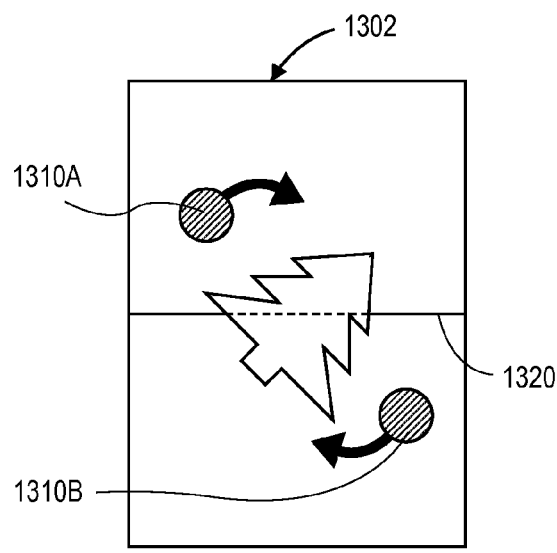
FIGS. 13A-13D illustrate a rotatable view with an internal threshold in accordance with some embodiments.
Figure 13B:
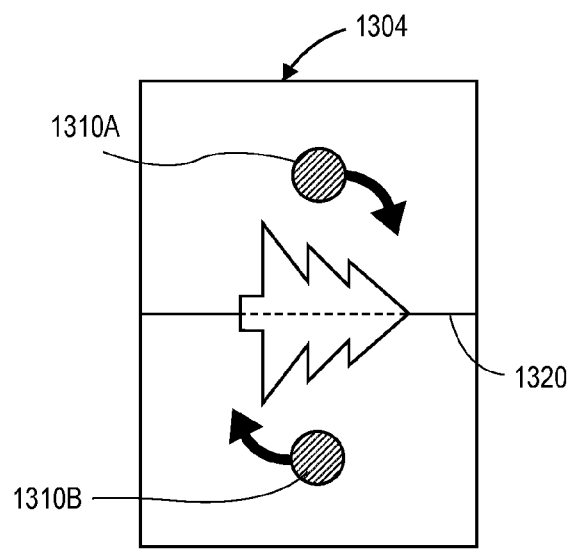
Figure 13C:
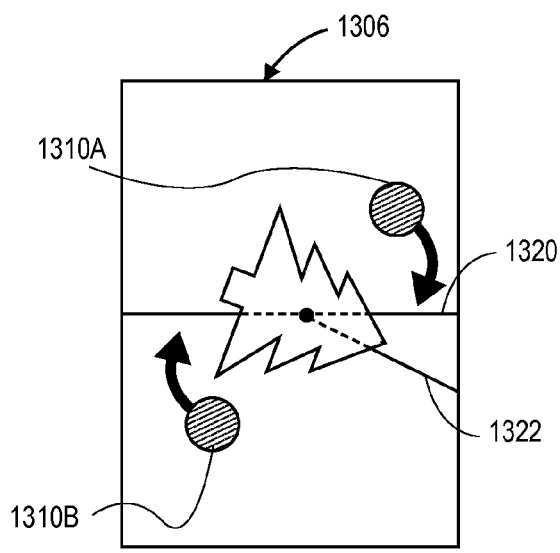
Figure 13D:
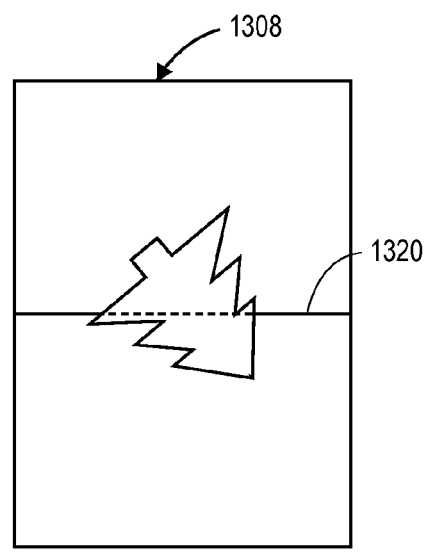

FIGS. 13A-13D illustrates alternative viewing modes which may include a detent. Whereas FIGS. 12A-12D illustrated a detent for scrolling or translation, FIGS. 13A-13D illustrate a detent for rotation. Although only the viewing modes are illustrated in FIGS. 13A-13D, they may be understood to be displayed on a computing device such as computing device 100 in FIG. 12A. FIG. 13A illustrates a viewing mode 1302 that displays a rotatable image. In this example, the image is of a tree. A rotation gesture with touches 1310A and 1310B may rotate this image. In the normal course of rotation as illustrated in FIG. 13A, the rotation of the image may correspond to the rotation of the gesture. That is, the gesture has an ordinary correspondence between a rotational movement of a rotation gesture and rotation of the image. This example may include a detent threshold 1320 for rotation. Note that this threshold may not be displayed in the viewing mode. Rather, the detent threshold 1320 is illustrated in FIGS. 13A-13D for clarity. A viewing mode 1304 may be reached following a rotation gesture from viewing mode 1302. In viewing mode 1304, the image of the tree has rotated so that the vertical/major axis from the perspective of the tree is now horizontal in the viewing mode, and aligned with the detent threshold. Up to this point, the rotation of the image of the tree may directly correspond to the rotation of the gesture. However, if the gesture continues past this detent threshold, the image may continue to rotate in the direction of the gesture, but with movement less than that expected from the ordinary correspondence of the gesture. This is similar to the resistance described above in FIGS. 12A-12D, except for rotation rather than translation. FIG. 13C illustrates a viewing mode 1306 where the image of the tree may be rotated past the detent threshold 1320 from the view illustrated in viewing mode 1304. In FIG. 13C, a second threshold 1322 is illustrated. As with the threshold 1320, this second threshold 1322 is illustrated in FIG. 13C for clarity, and may not be displayed in the viewing mode 1306. If the rotation gesture with touches 1310A and 1310B terminates prior to the rotation crossing the second threshold 1322, then the image of the tree may rotate back or "snap" to the position in viewing mode 1304. If the rotation gesture continues past the second threshold 1322, then the resistance to the rotation of the image may be removed, and the rotation of the image may again correspond to the rotation of the gesture. Similar to the case described for FIGS. 12A-12D, the gesture may be considered to have "broken through" the rotation detent. FIG. 13D illustrates a viewing model 1308 which may be the result of the gesture having broken through the detent in viewing mode 1306.

Figure 14:
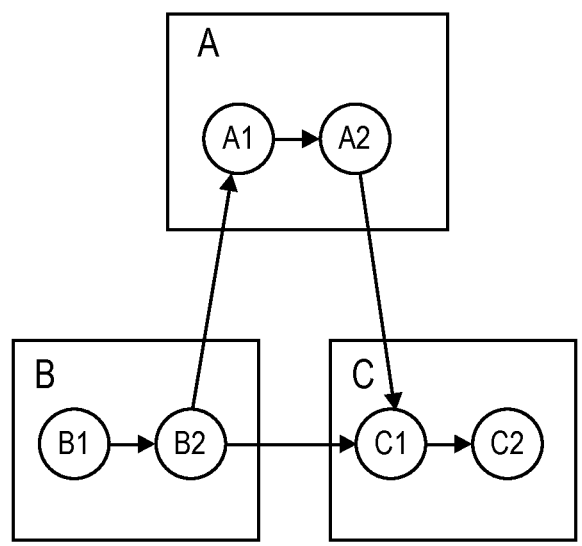
FIG. 14 illustrates an abstract hierarchical graph.
Figure 15A:
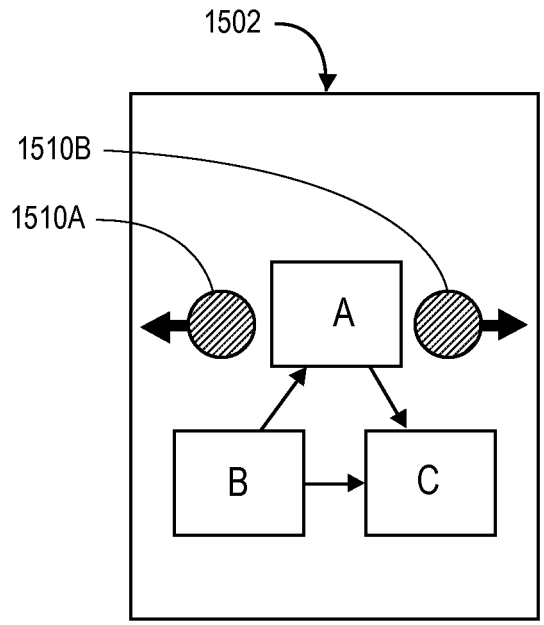
FIGS. 15A-15D illustrate a zoomable view with an internal threshold in accordance with some embodiments.
Figure 15B:
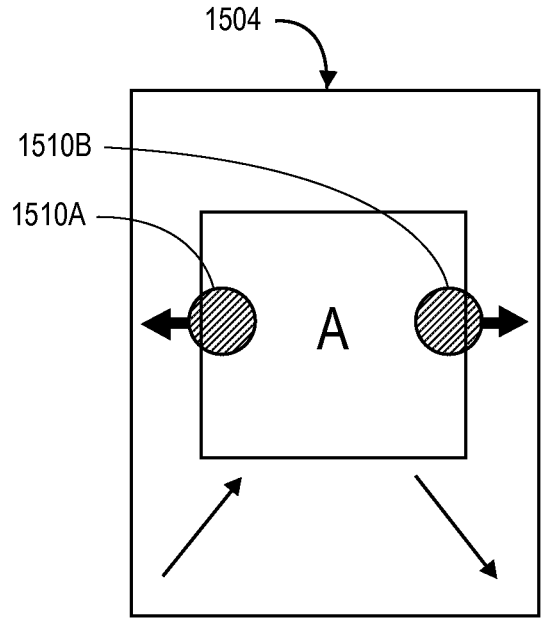
Figure 15C:
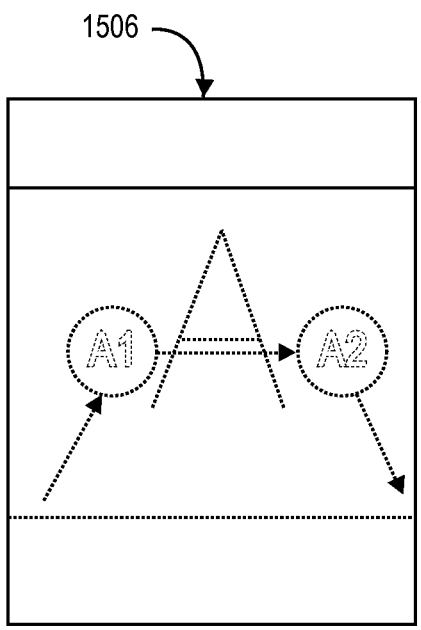
Figure 15D:
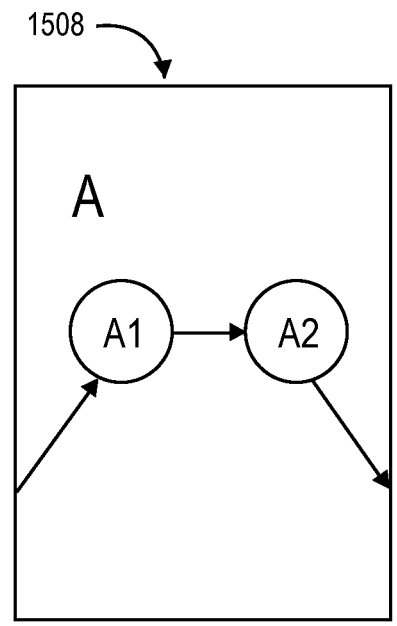

FIG. 14 illustrates an abstract hierarchical graph 1400 which may be displayed in the viewing modes in FIGS. 15A-15D. FIGS. 15A-15D illustrates another set of alternative viewing modes which may include a detent in these figures for zooming or scaling. The hierarchical graph 1400 in FIG. 14 consist of three meta-nodes labeled A, B, and C, each of which consist of two sub-nodes labeled A1 and A2, B1 and B2, and C1 and C2 for each respective meta-node. One may consider a simplified display of such a hierarchical graph where the sub-nodes are elided and only the meta-nodes are displayed. FIG. 15A illustrates such a viewing mode 1502 where a displayed representation of the hierarchical graph 1400 consists of only the three meta-nodes A, B, and C with their corresponding relationships. FIG. 15A also illustrates a zooming/de-pinching gesture with touches 1510A and 1510B. Such a gesture may zoom the displayed representation of the hierarchical graph 1400 at a scale that corresponds to the movement of the touches in the gesture. FIG. 15B depicts a viewing mode 1504 which may be the result of having zoomed from viewing mode 1502. At this level of zoom, there may be a zooming detent threshold such that if the zooming gesture with touches 1510A and 1510B continues, the displayed zooming may show resistance akin to that described for FIGS. 12A-D and FIGS. 13A-D, such that the rate at which the displayed representation of the hierarchical graph zooms, may be less than the movement of the touches in the gesture. In addition, as illustrated in FIG. 15C, once the gesture is zooming past the detent threshold, a viewing mode 1506 may be displayed that mixes the displayed representation of the hierarchical graph 1400 from viewing mode 1504, with appropriate zooming, with a second displayed representation of the hierarchical graph which shows the detailed sub-nodes. Such a mixture may use alpha-blending to smoothly introduce the detailed second representation as the zooming gesture continues. However, as in the case of drill-down transitions described in FIG. 2, FIG. 3, and FIG. 4, alternative transition animations for zooming detents may also be considered. Similar to the detent examples illustrated in FIGS. 12A-D and FIGS. 13A-D, a zooming detent may have a second zooming threshold such that if a zooming gesture terminates prior to the zooming level reaching this second zooming threshold, the displayed representation of the hierarchical graph may zoom back out to the level of the zooming detent threshold. In this example, if the gesture terminates prior to reaching the second zooming threshold when the display was as in viewing mode 1506, then the display may zoom back out to that of viewing mode 1504. If the gesture continues past the second zooming threshold then the display may continue to zoom to a viewing mode 1508 as illustrated in FIG. 15D. The zooming of the displayed representation of the hierarchical graph 1400, after the gesture has continued past the second zooming threshold, may correspond to the movement of the touches in the gesture instead of having resistance. In addition, supposing viewing mode 1508 supports not just zooming but panning/scrolling of the displayed representation, the viewing mode 1508 may optionally restrict such panning to within the displayed representation of the A meta-node.

Zooming detents as described above in FIGS. 15A-15D may be used to facilitate intuitive navigation of, for example, email threads, web browsing history, web page linking structures. In addition, such detents may be used with maps that may have discrete levels of zooming. For example, a digital map may consist of a road-map view of a region, but may additionally include the interior of buildings at some zoom scales. In such a case, one may use a zooming detent when transitioning from an exterior/road-map view of a building to an internal view.

Figure 16:
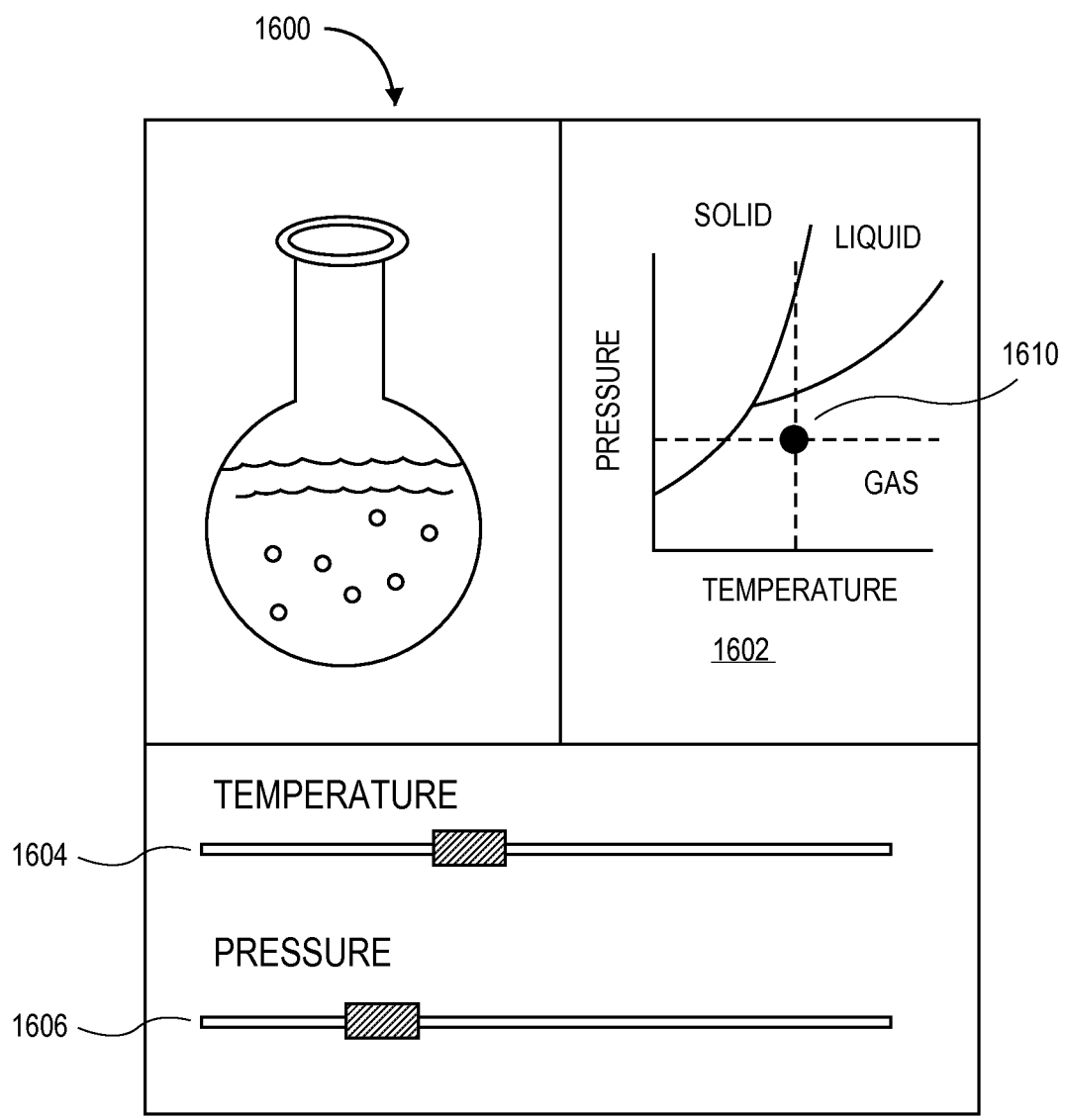
FIG. 16 illustrates a chemistry experiment simulation application in accordance with some embodiments.

FIG. 16 illustrates yet another alternative view containing detents. This figure illustrates a view of a simulated chemistry experiment 1600 where a user may control the temperature and pressure in the simulation using a slider 1604 for temperature and a slider 1606 for pressure. A section of the view 1600 may consist of a phase diagram 1602, where the current parameters for temperature and pressure based on sliders 1604 and 1606, may be indicated by a dot 1610. The detent thresholds in this example may correspond to the phase transition boundaries between the phases of gas, liquid, and solid. For example, from the state illustrated in FIG. 16, as the pressure is raised using a dragging gesture on slider 1606, the dot 1610 may move upwards in the phase diagram phase transition. As the dot 1610 reaches the phase transition boundary from gas to liquid, this may be a detent threshold, and the pressure slider may show resistance. In this example, unlike in the previous examples, this resistance may stop both the slider 1606 and the dot 1610 from moving entirely for some period. There may be a second threshold that the gesture must move beyond before slider 1606 and dot 1610 again move corresponding to the movement of the gesture. The detent illustrated in FIG. 16 may be considered to differ from those illustrated in FIGS. 12A-12D, FIGS. 13A-13D, and FIGS. 15A-15D in that it applies to a slider control rather than to a view such as the list view in FIGS. 12A-12D, the image view in FIGS. 13A-13D, or the displayed representation of a hierarchical graph in FIGS. 15A-15D. Detents that apply to controls that respond to rotation and zooming gestures may also be considered.

Now for each of the examples described above with FIGS. 12A-12D, FIGS. 13A-13D, FIGS. 15A-15D, and FIG. 16, the detent threshold may not necessarily exist bidirectionally. This may be explained further by returning to FIGS. 12A-12D. This example had illustrated how there may be a detent between the "Vegetables" and "Fruits" sections of the list displayed in viewing modes 1202-1208. In particular, the example illustrated how the gesture 1210 may initially encounter some resistance due to the detent in scrolling from the "Vegetables" to the "Fruits" sections, but with sufficient movement, may break through the detent. Now consider the reverse of scrolling from the "Fruits" to the "Vegetables" section, starting in viewing mode 1208. In this direction, there may or may not be a detent to cause resistance to scrolling. If there is no detent, then scrolling would simply move unhindered across the section boundary. If there is a detent, the behavior would be similar to that already described for FIGS. 12A-12D except in reverse. Such a detent that exists only when encountered from a particular direction may be called a "one-way" detent.

It is also possible to generalize all of these examples in FIGS. 12A-12D, FIGS. 13A-13D, FIGS. 15A-15D, and FIG. 16 by considering each to illustrate different ways in which a user may navigate within the space of possible viewing modes of an electronic document. Each possible viewing mode of the electronic document may be considered to be a transformation of a presentation of the document. For example, the example illustrated in FIGS. 12A-12D may be considered to be a presentation of an electronic document as a list, where a transformation of the presentation is a vertical translation of the presentation. Distinct translations may correspond to distinct viewing modes such as the viewing modes 1202-1208. The possible translations of the presentation may be considered to form a space of transformations. In this terminology, a gesture that affects the viewing mode of an electronic document may be equivalently considered to be updating the transformation of the presentation of the electronic document. In FIGS. 13A-13D, the space of transformations may be the possible rotations of a presentation of an electronic document, and in FIGS. 15A-15D, the space of transformations may be the possible scalings of a presentation of an electronic document. As mentioned in the description above for FIGS. 15A-15D, some variations in the presentation of the electronic document may occur in some embodiments. In that example, some details of the electronic document were only shown in some scalings of the presentation, while they were elided in other scalings.

The detent thresholds described above may be considered a subspace within this space of transformations, where if, in the course of updating the transformation in response to a gesture, the transformation enters such a detent subspace, then the response to the gesture may be altered to simulate a variable change in resistance in terms of the user's experience of the amount of effort (for example, the scrolling gesture motion through one or more individual gestures) to achieve a change in apparent motion of a document or image on the display. Additionally, the variable change in resistance does not have to be fully bidirectional, but may have regions with directional qualities to support features, such as having the apparent resistance increase when a particular region is approached from one direction but not from another. Such an alteration to the response to the gesture may be considered an operator on transformation updates. For example, an operator that does not in fact alter a transformation update may be considered an identity operator, and an operator that reverses a transformation update may be considered an inverse operator. An operator that scales a transformation update with a scaling coefficient less than 1 may simulate resistance. Note that such a detent subspace may not be pre-determined, and may depend on the current transformation of the presentation. In particular, one-way detents would be a case in which a detent subspace may or may not exist depending on the current transformation. Note also that a detent subspace may be internal to the space of transformations such that there is an "other side" of the detent subspace to which a transformation may break through.

Figure 17:
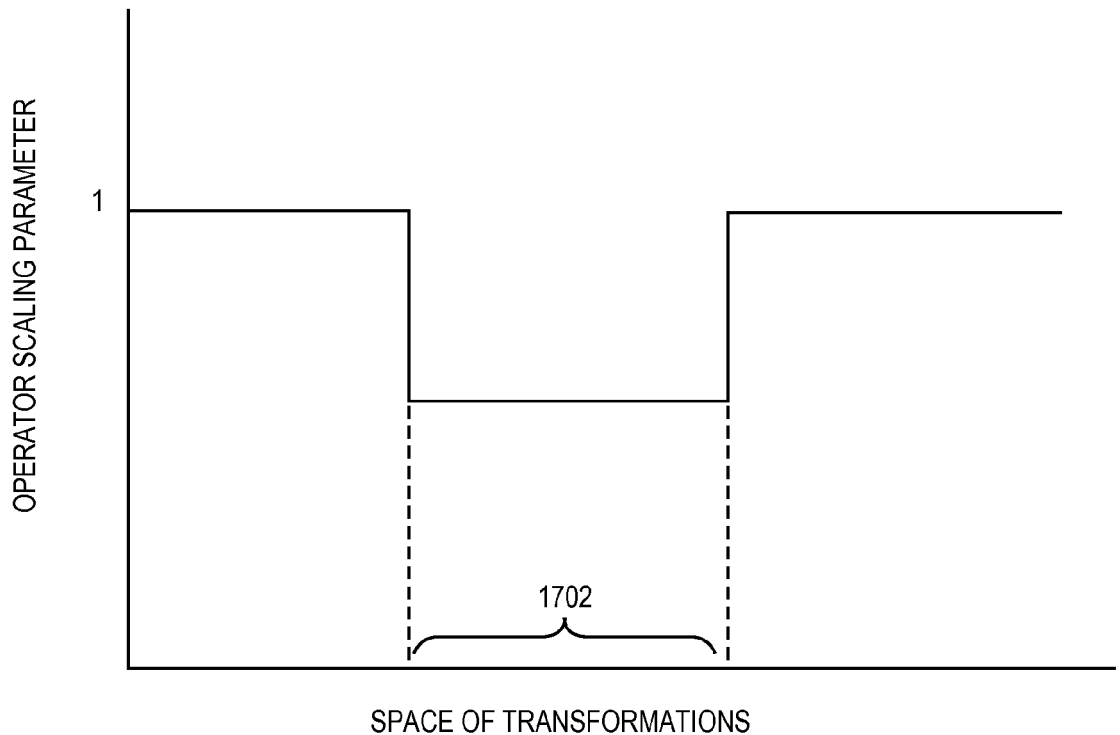
FIG. 17 is a chart illustrating a dependence on the transformations of a view of an operator on transformation updates in accordance with some embodiments.

From this perspective and generalizing further, detents may be viewed as an application of an operator on a natural transformation update. A natural transformation update of a gesture may be one in which the updates to the transformation matches the movement of the gesture so as to provide the user with the sense of directly or physically manipulating a view on a computing device. An example of an operator depending on the transformation is illustrated in FIG. 17. In this figure, the operator is a scaling operator and the graph in the figure shows the scaling parameter of the scaling operator on the Y-axis as a function of the transformation in the space of transformations on the X-axis. For example, the X-axis of the graph representing the space of transformations may correspond to the space of possible translations in the example of FIGS. 12A-12D, or may correspond to the space of possible rotation in the example of FIGS. 13A-13D, or the space of possible scalings in the example of FIGS. 15A-15D. In this example, a subspace 1702 of the space of transformations may be a detent subspace. Inside this subspace, the scaling parameter may be some value less than 1, and outside of this subspace, the scaling parameter may be 1, which may correspond to an identity operator. In this example, then, when a user gestures while the transformation is outside of the detent subspace the transformation update may be the natural one, but once the transformation is within the detent subspace the transformation update may be scaled down as if to simulate "resistance." Note that a 1-dimensional space is used as the space of transformations for simplicity, but the space of transformations may be of higher dimension in some embodiments. For example, detents may be defined for views that may be scrolled in both horizontal and vertical directions (or any diagonal combination thereof). In such an embodiment, the dimensionality of the space of transformations would be 2.

Although in this example, a simple piecewise-constant function was illustrated as the dependence of the scaling parameter on the transformation, it will be apparent to one of ordinary skill in the arts that other functions or relations may be considered. For example, instead of the discontinuous jump in the scaling parameter at the boundary of the detent subspace, there may be a smooth reduction in the parameter over some portion of the space of transformations. Similarly, operators that are not scaling operators may be considered.

Furthermore, note that the dependence of the scaling parameter on the space of transformations itself may also be updated based on the transformation or the gesture. Such an update may occur, for example, when the detent subspace is past a threshold. Referring back to FIG. 13C, recollect that in that example, the detent subspace would have been, although not described as such in the description there, for angles between the horizontal indicated by the detent threshold 1320 and the second threshold 1322. In that example, this was the detent subspace because the angle approached the detent threshold clockwise "from above." If, in contrast, the angle had originally been "below" the detent threshold and had approached the detent threshold counter-clockwise "from below," then the detent subspace may have been above the horizontal detent threshold 1320 and therefore different from that illustrated in FIG. 13C. In addition, one-way detents may update the dependence of the scaling parameter on the space of transformations since by the definition of one-way detents, once a user has "broken through" a one-way detent the reverse of the gesture does not encounter a detent.

In addition, note that the operator may depend not only on the transformation, but also the gesture. For example, a detent may simulate resistance when moving past a detent, but if the user then reverses the gesture to move back resistance may not be simulated. In such a case, the scaling parameter of a scaling operator depends not only on the transformation but the direction of the gesture. Another example in which the operator may depend on the gesture may occur in the case illustrated in FIG. 16. As mentioned in the discussion for this figure, a control may show "resistance" to a gesture by not moving for some period at all. In such a case, since the transformation is not updating during this period of non-movement, the only way to "break through" such a detent would be to cross a threshold in the movement of the gesture itself rather than within the space of transformations.

The reversals of the transformation updates described for FIGS. 12A-12D, FIGS. 13A-13D, FIGS. 15A-15D, and FIG. 16 when the gesture terminates prior to "breaking through" a detent may also be generalized and described in this more general context as follows. When a first condition is met, a second condition may be evaluated. The first condition, for example, may determine whether the gesture has terminated. The second condition may determine, for example, whether a certain threshold in the space of transformations had not been reached during the course of the gesture. Alternatively, the second condition may determine whether the transformation is within a subspace of the space of transformations. As another example, the second condition may determine whether the gesture has moved past a gesture threshold. If this condition is yes, then the transformation may continue to be updated in some manner until a third condition holds. Similar to the second condition, this third condition may, for example, determine whether the transformation is within a subspace of the space of transformations. The manner in which the transformation continues to be updated may be a substantial reversal of the updates to the transformation during the course of the gesture. Note that in addition to the reversals described in FIGS. 12A-12D, FIGS. 13A-13D, FIGS. 15A-15D, and FIG. 16, this generalization also captures the case described in FIGS. 12C and 12D, where after having "broken through" a detent then the transformation may continue to be updated until only the "Fruits" section is visible as in viewing mode 1208. In this latter case, the first condition may determine whether the detent has been "broken through."

Figure 18:
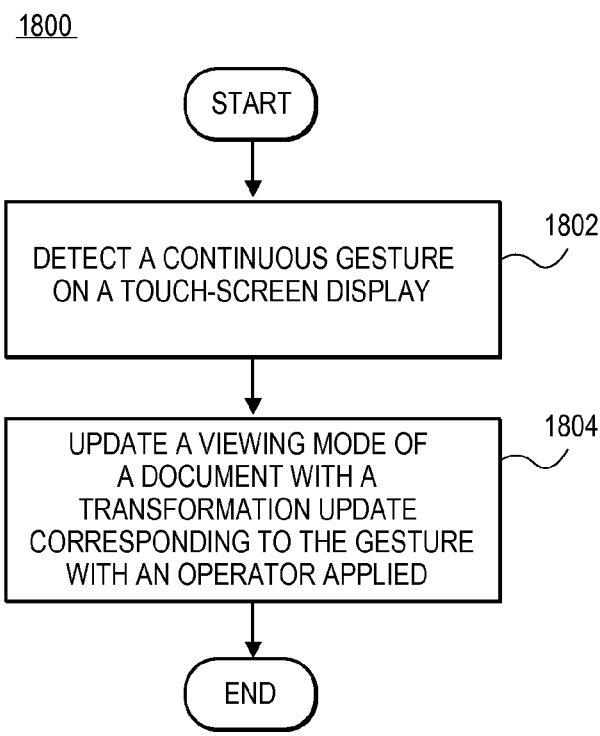
FIG. 18 is a flowchart illustrating an embodiment of a method for handling internal thresholds of a view.

FIG. 18 is a flowchart illustrating an embodiment of a method 1800 for supporting this generalized notion of detents. At 1802, the method 1800 may detect a continuous gesture on a touch-screen display. At 1804, the method 1800 may update a viewing mode of a document based on the detected continuous gesture with an operator applied to the natural update of the gesture.

Figure 19:
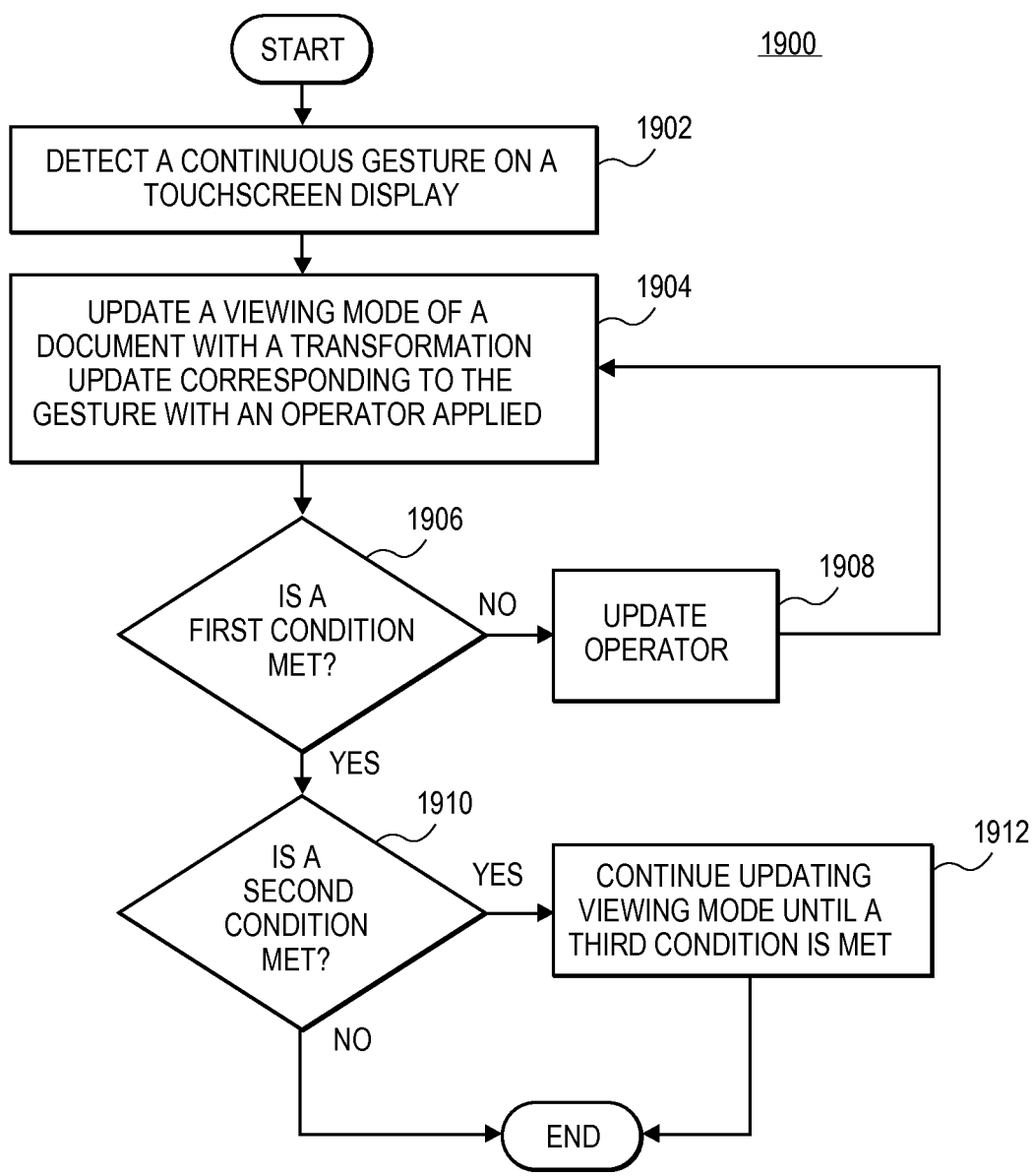
FIG. 19 is a flowchart illustrating another embodiment of a method for handling internal thresholds of a view.

FIG. 19 is a flowchart illustrating an embodiment of another method 1900 for supporting this generalized notion of detents. At 1902, the method 1900 may detect a continuous gesture on a touch-screen display. At 1904, the method 1900 may update a viewing mode of a document based on the detected continuous gesture with an operator applied to the natural update of the gesture. Thus far, the method 1900 has been the same as the method 1800. At 1906, the method 1900 may determine whether a first condition is met. If the answer at 1906 is no, then at 1908, the method 1900 may update the operator based on the current viewing mode and the gesture and return to 1904. If the answer at 1906 is yes, then the method 1900 may at 1910 determine whether a second condition is met. If the answer at 1910 is yes, then the method 1900 may at 1912 continue updating the viewing mode in some manner until a third condition is met, and once this third condition is met, end. If the answer at 1910 is no, then the method 1900 may end.

We now turn to various additional embodiments of methods for transitioning viewing modes.

Figure 20:
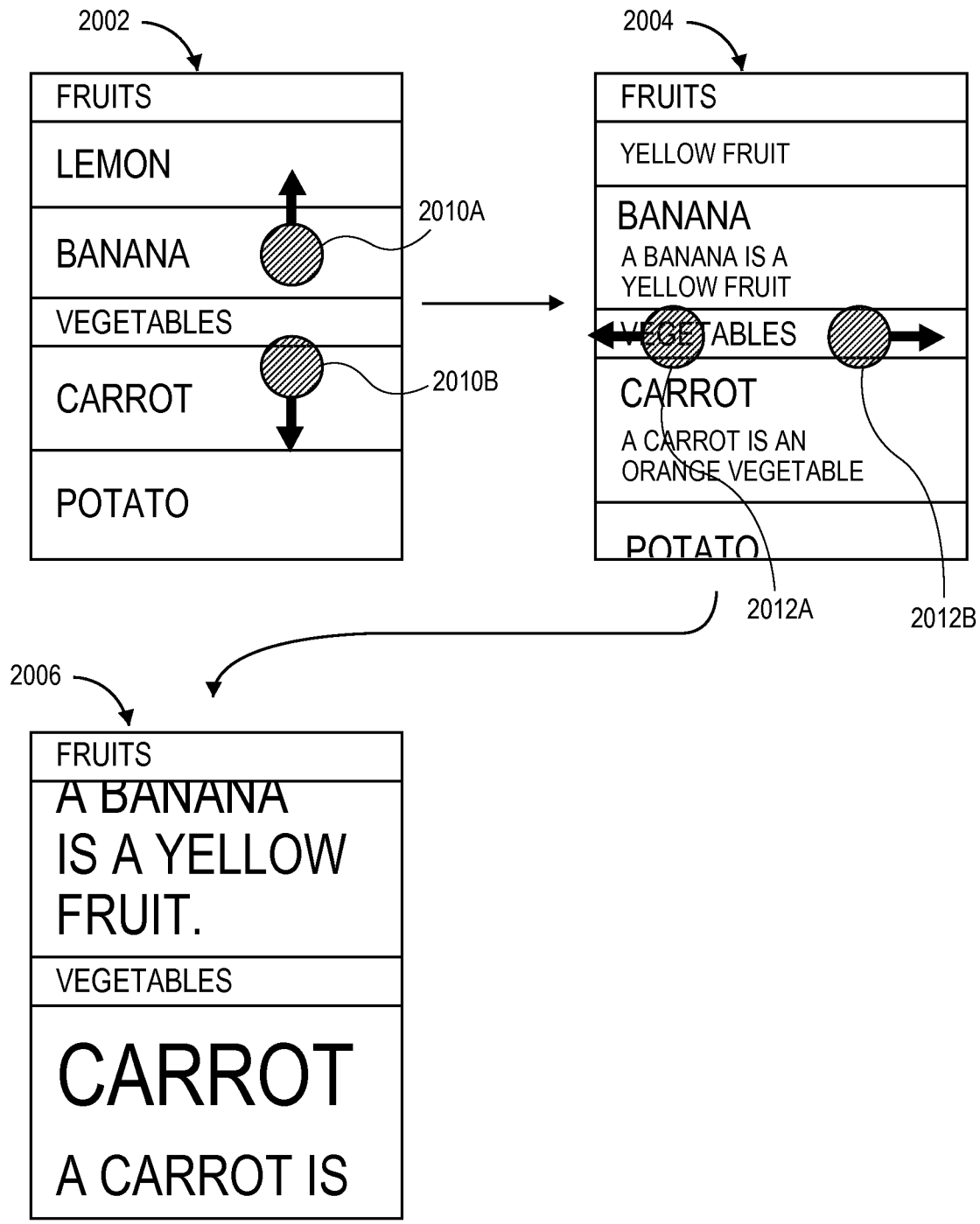
FIG. 20 illustrates three viewing modes of a list in accordance with some embodiments.

The first is a use of a pinching/de-pinching zooming gesture where the angle of the gesture may determine the viewing mode transition. FIG. 20 illustrates a viewing mode 2002 displaying a list of foods in a "Fruit" section, with the rows "Lemon" and "Banana" visible in this section, and a "Vegetables" section, with rows "Carrot" and "Potato" visible in this section. A de-pinching gesture in a substantially vertical direction consisting of touches 2010A and 2010B may effect a transition of the viewing mode 2002 to a viewing mode 2004 in which the height of each row has increased, and additional details concerning the food in each row is displayed in the row. A de-pinching gesture in a substantially horizontal direction consisting of touches 2012A and 2012B may effect a transition of the viewing mode 2004 to a viewing mode 2006 in which the height of each row has again increase further, but rather than there being additional details, the font size of the text used to render the content of each row has been increased. A main point to note in this example is that the change in the viewing mode qualitatively differed between when the direction of the de-pinching gesture was substantially vertical versus when the direction was substantially horizontal.

Figure 21:
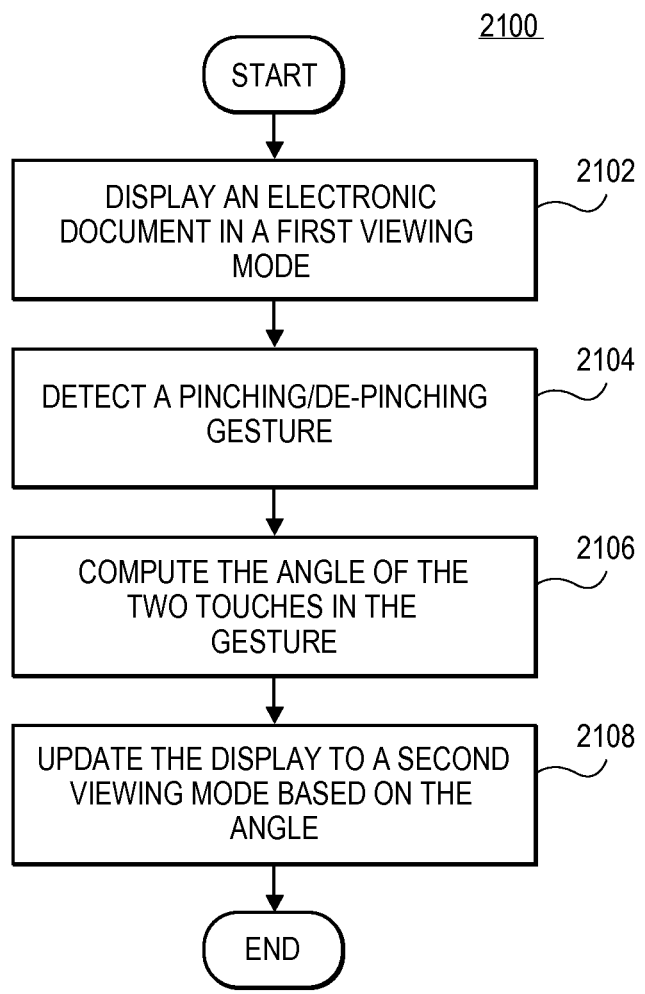
FIG. 21 is a flowchart illustrating an embodiment of a method for updating a viewing mode.

FIG. 21 is a flowchart illustrating an embodiment of a method 2100 enabling a transition such as that illustrated in FIG. 20. In 2102, the method 2100 displays an electronic document in a first viewing mode. In 2104, the method detects a pinching or de-pinching gesture consisting of two touches. Then in 2106, the method computes the angle formed by a line joining the two touches of the gesture with respect to a pre-determined reference orientation. Based on this angle, in 2108 the method updates the display to a second viewing mode of the document. In the example in FIG. 20, the viewing mode update differed qualitatively based on whether this angle was substantially horizontal or substantially vertical. Some embodiments may consider alternative updates to the viewing mode based on the angle such as classifying substantially diagonal angles as distinct from angles that are substantially horizontal or substantially vertical. Note that the updates to the viewing mode may be continuous or discrete with respect to the gesture.

Figure 22A:
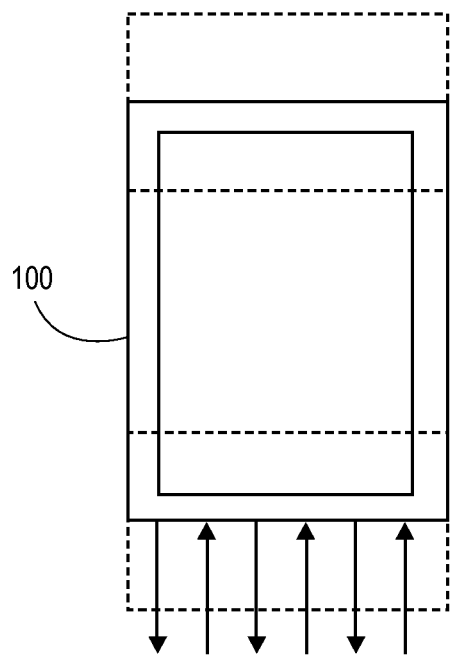
FIGS. 22A and 22B illustrate shaking vs. rocking of a computing device in accordance with some embodiments.
Figure 22B:
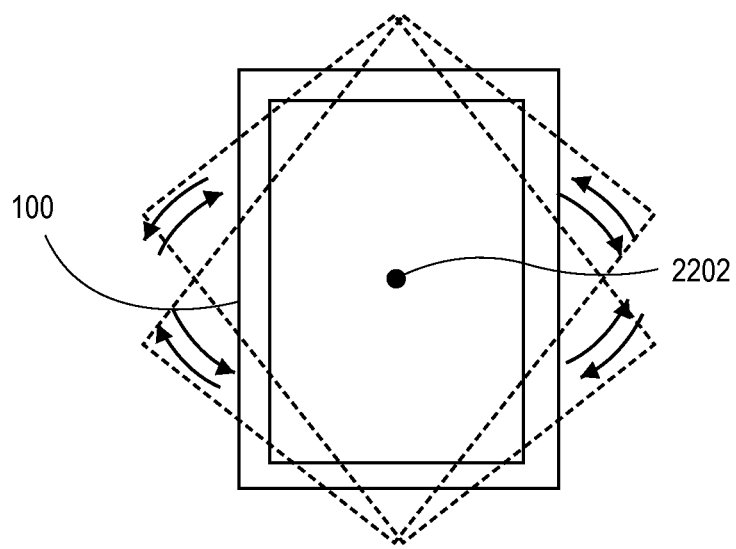

Next, we describe an embodiment of a method of detecting a "rocking" motion of a device to perform a function on a computing device. FIGS. 22A and 22B illustrate two repeated motions of the computing device 100. In this example of FIGS. 22A and 22B, suppose that computing device 100 may contain sensors that detect various motions of the device such as an accelerometer and/or a gyroscope. In particular, suppose that these sensors, either individually or in combination, provide a means for substantially detecting the motion of the center of the device 100. FIG. 22A illustrates a "shaking" motion where the device translates back and forth some number of times. FIG. 22B illustrates a "rocking" motion where the device rotates back and forth some number of times. In FIG. 22B, 2202 indicates the center of the device 100. What distinguishes the repeated motions illustrated in FIG. 22A from that in FIG. 22B is that in FIG. 22A, the center of the computing device 100 translates with the repeated motion, while in FIG. 22B, the center of the device is substantially stationary. If a repeated rocking motion as illustrated in FIG. 22B is detected on a computing device where the movement of the center of the device is substantially stationary or below a threshold, then a function on the device may be performed. This function may be distinct from a function that may be performed on the device when a repeated shaking motion as illustrated in FIG. 22A is detected. For example, conventional touch-screen devices may include an "undo" function that may be performed when a repeated shaking motion is detected. In contrast, when a repeated rocking motion is detected, a different function, for example a function that updates a viewing mode to a "home" viewing mode, may be performed in some embodiments.

Figure 23:
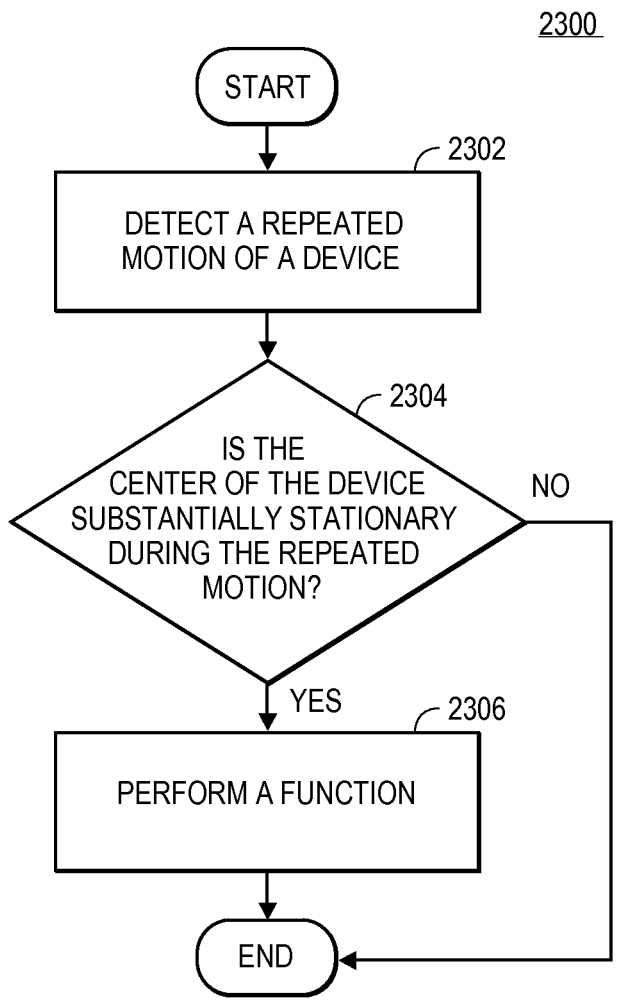
FIG. 23 is a flowchart illustrating an embodiment of a method for performing an action based on a repeated motion of a device.

FIG. 23 is a flowchart illustrating an embodiment of a method 2300 enabling the performing of a function as described above for FIG. 22A and FIG. 22B. In 2302, the method 2300 detects a repeated motion of a computing device. The repeated motion may consist of a rotational component and a translational component, each having a magnitude in the repeated motion. In 2304, the method 2300 determines whether the center of the device was substantially stationary during the repeated motion. For example, the method 2300 may determine whether the translational component of the repeated motion is below a certain threshold. If the answer in 2304 is yes, then in 2306 the method 2300 may perform a function and then end. If the answer in 2304 is no, then the method 2300 may end. Although not illustrated, the method may optionally also use an additional threshold to avoid triggering the function when the magnitude of the repeated motion is small. Similarly, in some embodiments the number of repetitions may be used to determine whether the function should be triggered. For example, in some embodiments there may be a minimum number of rocking motions which must be detected before the function is triggered; some embodiments may include a maximum number of rocking motions.

Figure 24A:
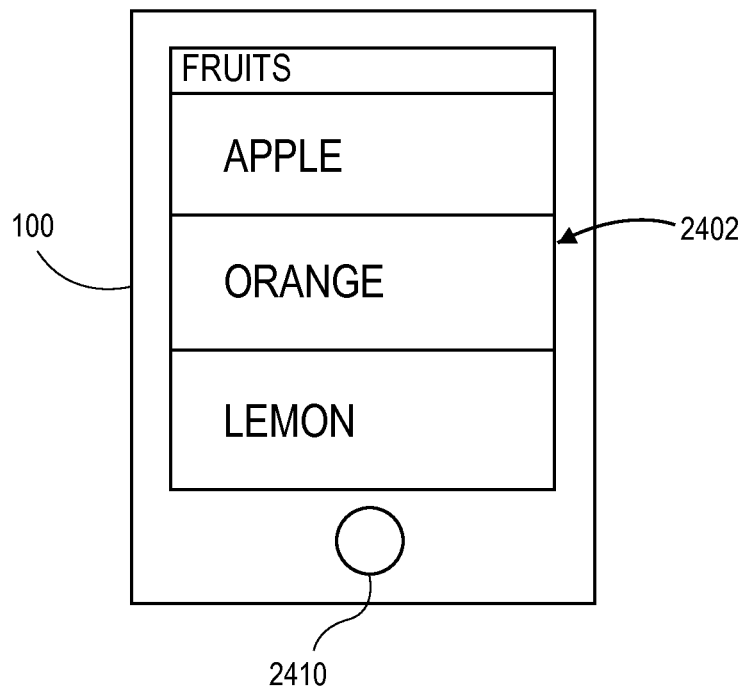
FIGS. 24A and 24B illustrate two viewing modes of a list in accordance with some embodiments.
Figure 24B:
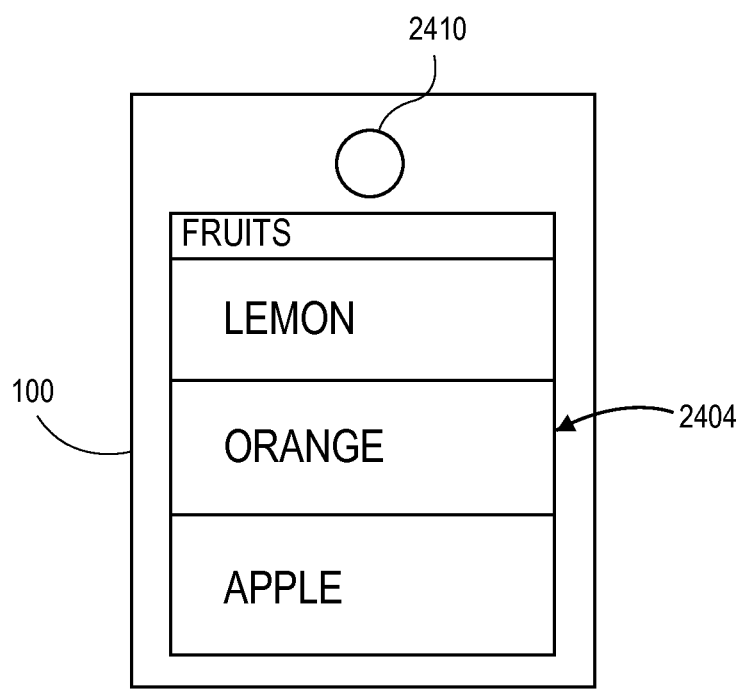

Next we describe an embodiment of a method of using the orientation of a computing device to reverse the ordering of a list of items. Conventional computing devices frequently provide a mechanism for reversing the order of a sorted list of items. For example, in a tabular display of data, selecting a column header may sort the rows of the tabular display in one ordering, and selecting the column header again may reverse the order in which the rows are sorted. On a computing device containing a means of detecting the orientation of the device such as with an accelerometer, a reversal in the orientation of the device may be used to reverse the order of a list of items. This is illustrated in FIG. 24A and FIG. 24B that shows a computing device 100 in two orientations, with a viewing mode 2402 in one orientation and a viewing mode 2404 in the reverse orientation. In FIG. 24A and FIG. 24B, a button 2410 on the computing device 100 is illustrated simply to clarify the intended orientation of the device. On a conventional computing device with a means of detecting the orientation of the device, a reversing of the orientation of the device by the user may re-orient the viewing mode so as to be "right side up" for the user, but may not update the content of the viewing mode. In contrast, this figure illustrates an embodiment of a method in which the content of the viewing mode is updated. In both viewing modes 2402 and 2404, a list of fruits, "Apple," "Orange," and "Lemon" is displayed in a list. However, the order in which the fruits are displayed in viewing mode 2404, is the reverse of that in viewing mode 2402. This may be viewed as simulating an effect where the ordering of the items in the list is "attached" to the device, even if the presentation of each item is appropriate for each orientation. For example, in FIG. 24A and FIG. 24B, the "Lemon" row is the row closest to the button 2410 in both viewing modes 2402 and 2404 as would be the case if one simply looked upside-down at viewing mode 2402, but in viewing mode 2404 the text "Lemon," along with the other textual element, has been reoriented to be "right side up."

In addition to updating the viewing mode, in some embodiments, the transition from viewing mode 2402 to viewing mode 2404 may include animations to provide feedback to the user concerning the updates to the viewing mode. For example, the transition may animate each row rotating individually. Specifically for the viewing modes illustrated in FIG. 24A and FIG. 24B, in such a transition animation each of the "Apple", "Orange", and "Lemon" rows may be animated to rotate around a point substantially close to their respective centers. In some embodiments, as illustrated in FIG. 24A and FIG. 24B, a header such as "Fruits" may be displayed in the viewing mode, and this header may be placed at the "top" of the viewing mode with respect to the user, regardless of the orientation of the device. In such embodiments, the center of rotation for each row may be offset from the center of the row to accommodate the space required to display such a header.

Figure 25:
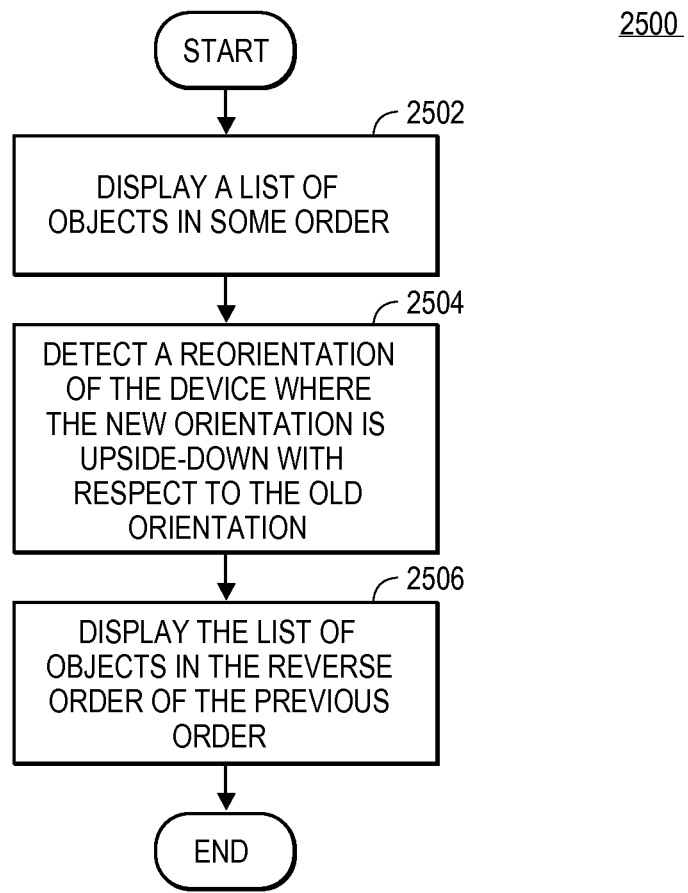
FIG. 25 is a flowchart illustrating an embodiment of a method for updating a viewing mode.

FIG. 25 is a flowchart illustrating an embodiment of a method 2500 for transitioning between two viewing modes as was described for FIG. 24A and FIG. 24B. In 2502, the method 2500 may display on a computing device such as device 100 a first viewing mode of a list of objects with an ordering. In 2504, the method 2500 may detect a reorientation of the device where the new orientation is a rotation of the old orientation in the plane of the display, and the angle of the rotation is approximately 180 degrees. In other words, the method 2500 may detect that the device has been flipped "upside down." In 2506, the method 2500 may update the display to a second viewing mode of the list of objects. For example, the ordering of the objects in the list may be substantially reversed in the second viewing mode. In some embodiments other updates to the second viewing mode may also be considered.

Figure 26:
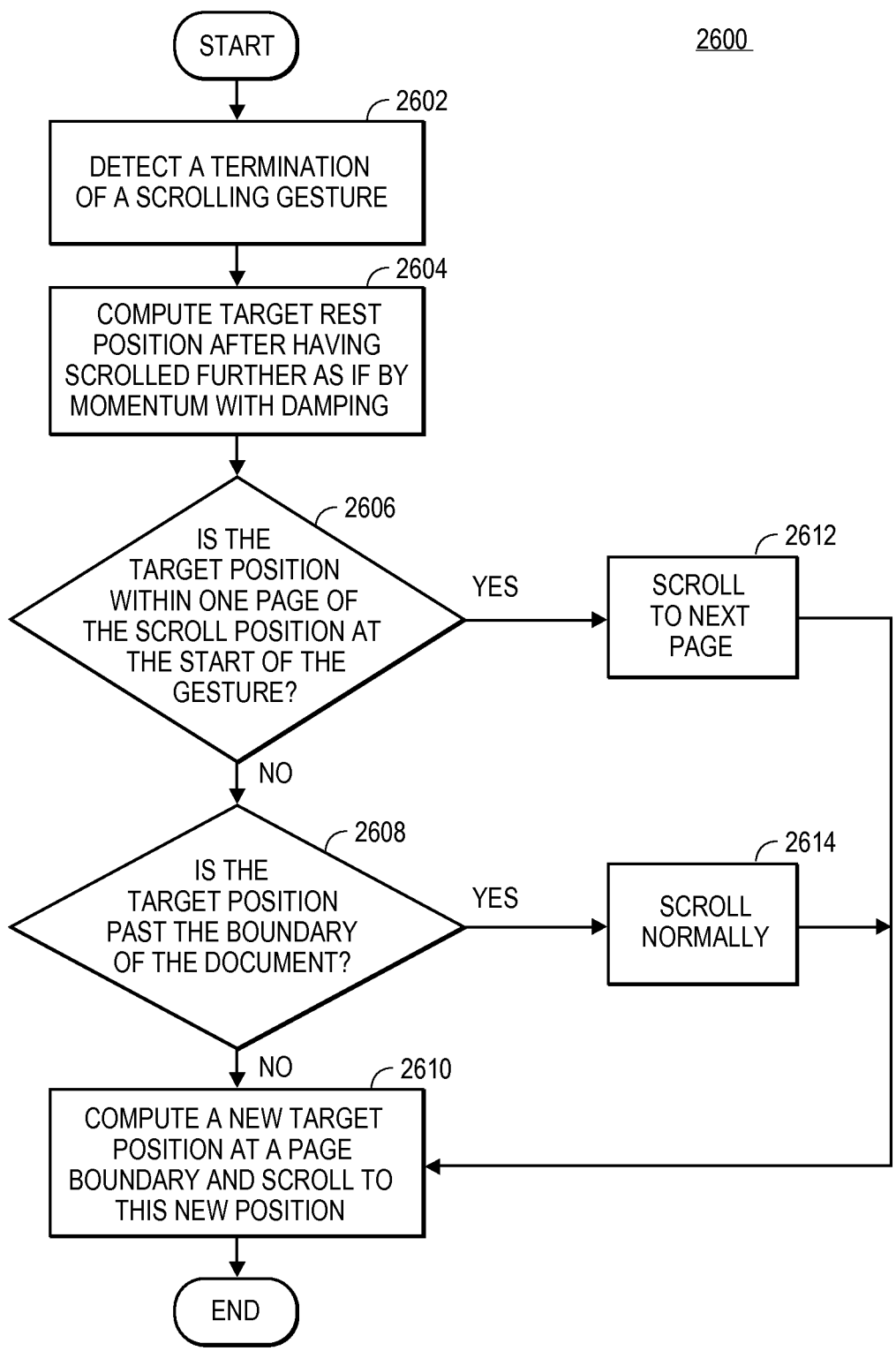
FIG. 26 is a flowchart illustrating an embodiment of a method for combining scrolling with paging.

Finally, we describe an embodiment of a method that combines scrolling with paging. Both scrolling and paging are separately seen on conventional touch-screen devices, but not in combination. FIG. 26 is a flowchart illustrating an embodiment of a method 2600 for this combination. This figure assumes that there is a pre-determined "page size" where this page size may or may not correspond to a display size of a device. In 2602, the method detects a termination of a scrolling gesture on a scrolling view of a document. Then, in 2604, the method computes a target position at which the scrolling may come to rest if the scrolling were to continue as if by momentum with damping. In 2606, the method determines whether this target position is substantially within one page of the position of the view when the scroll gesture started. If the answer at 2606 is yes, then in 2612 the method scrolls to the next page of the view and ends. Otherwise, if the answer at 2606 is no, then in 2608 the method determines whether the target position is past the boundary or edge of the document. If the answer at 2608 is yes, then the method scrolls the view normally, which may include a "bounce" at the boundary of edge of the document, and ends. If the answer at 2608 is no, then the method 2600 computes a new target position that is a position aligned with the page size closest to the computed target position, and scrolls to this new target position and ends. An alternative embodiment generalizing the method 2600 that allows for calibrating of the sensitivity of the paging may, in 2606, compare the target position to a pre-determined multiple of the page size, where this pre-determined multiple may not be integral.

While the above description contains many specificities, these should not be construed as limitations on the scope of any embodiment, but as exemplifications of various embodiments thereof. Many other ramifications and variations are possible within the teachings of the various embodiments.

For example, one may consider an alternative embodiment of the drilldown transition in which the primary and secondary axis directions (and therefore the corresponding roles of the columns and rows) are switched and/or reversed. Such an embodiment may be useful, for example, if the primary language used to display the text is in Japanese, which has a writing system whose directionality differs from that of English. Similarly, an alternative embodiment may reverse the drilldown and drillup rotation directions.

As another example, an embodiment of one-way detents was described above with translation, but alternative embodiments with one-way detents for rotation and zooming may also be considered. In addition, detents may cause effects along with the application of the transformation operator described above. For example, a device which includes a vibration component may vibrate the device upon entering a detent region.

Although some of the examples above were described with gestures on a touch-screen display as user input, alternative embodiments may utilize other forms of user inputs such as gestures on a touchpad or voice recognition. In addition, any gestures on touch-screens described above are examples only, and other gestures may be considered.

In addition, the various aspects, embodiments, implementations or features of the invention may be used separately or in any combination. Thus, the scope should be determined by the appended claims and their legal equivalents, and not by the examples given.

I claim:

1. A computer-implemented method for navigating a structured document, comprising:
   detecting a user input and determining whether the user input is a request to drilldown or drillup through the structured document corresponding to a change from a first representation of the structured document to a second representation of the structured document having a different level of detail than the first representation, where a drilldown corresponds to a greater level of detail and a drillup corresponds to a reduced level of detail; and
   in response to detecting the user input, displaying on a display a transition animation to indicate a transition in the representation of the structured document from the first representation to the second representation wherein the transition animation for a drilldown rotates in the plane of the display a portion of the first representation to the second representation in a first rotational direction and the transition animation for a drillup rotates in the plane of the display the first representation to a portion of the second representation in a second rotational direction opposite that of the first rotational direction.

2. The computer-implemented method of claim 1 wherein the document comprises objects and the first representation of the structured document includes a first list of a subset of objects in the document.

3. The computer-implemented method of claim 2 wherein objects in the first list that are themselves a set of objects are also represented as lists in the first representation with a direction orthogonal to the direction of the first list whereby the first representation includes a grid.

4. The computer-implemented method of claim 1 wherein the user input is continuous, and further comprising:
   in response to detecting a starting of the user input, initiating the transition animation.

5. The computer-implemented method of claim 4 wherein the movement of the transition animation corresponds to the movement of the user input.

6. The computer-implemented method of claim 4, further comprising:
   in response to detecting a reversal of the user input reversing the direction of the transition animation.

7. The computer-implemented method of claim 4, further comprising:
   in response to detecting a termination of the user input, if a condition is met, reversing the direction of the transition animation.

8. The computer-implemented method of claim 7 wherein the condition determines whether the user input remained within a threshold.

9. The computer-implemented method of claim 1 wherein the user input is a gesture on a touch-screen display.

10. The computer-implemented method of claim 9 wherein the user input is a multi-finger gesture.

11. The computer-implemented method of claim 10 wherein the user input is a rotation gesture and the direction of the rotation determines whether the user input is a request to drilldown or drillup.

12. The computer-implemented method of claim 9 wherein the user input is a tap gesture.

13. The computer-implemented method of claim 9 wherein the user input is a curving single-touch gesture and the direction of the curving determines whether the user input is a request to drilldown or drillup.

14. The computer-implemented method of claim 1 wherein the transition animation uses 3D or pseudo-3D effects.

15. The computer-implemented method of claim 1 wherein the transition animation further comprises an animation depicting a turning of a page.

16. The computer-implemented method of claim 1 wherein the transition animation further comprises an animation depicting a rotation of a box.

17. A computer program product comprising a non-transitory computer readable storage medium storing one or more programs, the one or more programs comprising instructions, which when executed by a computing device, causes the device to navigate a structured document by:
  detecting a user input and determining whether the user input is a request to drilldown or drillup through the structured document corresponding to a change from a first representation of the structured document to a second representation of the structured document having a different level of detail than the first representation, where a drilldown corresponds to a greater level of detail and a drillup corresponds to a reduced level of detail; and
  in response to detecting the user input, displaying on a display a transition animation to indicate a transition in the representation of the structured document from the first representation to the second representation wherein the transition animation for a drilldown rotates in the plane of the display a portion of the first representation to the second representation in a first rotational direction and the transition animation for a drillup rotates in the plane of the display the first representation to a portion of the second representation in a second rotational direction opposite that of the first rotational direction.

18. The computer program product of claim 17 wherein the document comprises objects and the first representation of the structured document includes a first list of a subset of objects in the document.

19. The computer program product of claim 18 wherein objects in the first list that are themselves a set of objects are also represented as lists in the first representation with a direction orthogonal to the direction of the first list whereby the first representation includes a grid.

20. The computer program product of claim 17 wherein the user input is continuous, and further comprising:
  in response to detecting a starting of the user input, starting the transition animation.

21. The computer program product of claim 20 wherein the movement of the transition animation corresponds to the movement of the user input.

22. The computer program product of claim 20, further comprising:
  in response to detecting a reversal of the user input reversing the direction of the transition animation.

23. The computer program product of claim 20, further comprising:
  in response to detecting a termination of the user input, if a condition is met, reversing the direction of the transition animation.

24. The computer program product of claim 23 wherein the condition determines whether the user input remained within a threshold.

25. The computer program product of claim 17 wherein the user input is a gesture on a touch-screen display.

26. The computer program product of claim 25 wherein the user input is a multi-finger gesture.

27. The computer program product of claim 26 wherein the user input is a rotation gesture and the direction of the rotation determines whether the user input is a request to drilldown or drillup.

28. The computer program product of claim 25 wherein the user input is a tap gesture.

29. The computer program product of claim 25 wherein the user input is a curving single-touch gesture and s direction of the curving determines whether the user input is a request to drilldown or drillup.

30. The computer program product of claim 17 wherein the transition animation uses 3D or pseudo-3D effects.

31. The computer program product of claim 17 wherein the transition animation further comprises an animation depicting a turning of a page.

32. The computer program product of claim 17 wherein the transition animation further comprises an animation depicting a rotation of a box.

33. A computing device, comprising a display; one or more processors; memory; and one or more programs, where the one or more programs are stored in the memory and configured to be executed by the one or more processors, the one or more programs including instructions for navigating a structured document by:
  detecting a user input and determining whether the user input is a request to drilldown or drillup through the structured document corresponding to a change from a first representation of the structured document to a second representation of the structured document having a different level of detail than the first representation, where a drilldown corresponds to a greater level of detail and a drillup corresponds to a reduced level of detail; and
  in response to detecting the user input, displaying on a display, a transition animation to indicate a transition in the representation of the structured document from the first representation to the second representation wherein the transition animation for a drilldown rotates in the plane of the display, a portion of the first representation to the second representation in a first rotational direction, and the transition animation for a drillup rotates in the plane of the display the first representation to a portion of the second representation in a second rotational direction opposite that of the first rotational direction.

34. The computing device of claim 33 wherein the document comprises of objects and the first representation of the structured document includes a first list of a subset of objects in the document.

35. The computing device of claim 34 wherein objects in the first list that are themselves a set of objects, are also represented as lists in the first representation with a direction orthogonal to the direction of the first list whereby the first representation includes a grid.

36. The computing device of claim 33 wherein the user input is continuous, and further comprising:
  in response to detecting a starting of the user input, starting the transition animation.

37. The computing device of claim 36 wherein the movement of the transition animation corresponds to the movement of the user input.

38. The computing device of claim 36 further comprising:
  in response to detecting a reversal of the user input reversing the direction of the transition animation.

39. The computing device of claim 36, further comprising:
in response to detecting a termination of the user input, if a condition is met, reversing the direction of the transition animation.

40. The computing device of claim 39 wherein the condition determines whether the user input remained within a threshold.

41. The computing device of claim 33 wherein the user input is a gesture on a touch-screen display.

42. The computing device of claim 41 wherein the user input is a multi-finger gesture.

43. The computing device of claim 42 wherein the user input is a rotation gesture and the direction of the rotation determines whether the user input is a request to drilldown or drillup.

44. The computing device of claim 41 wherein the user input is a tap gesture.

45. The computing device of claim 41 wherein the user input is a curving single-touch gesture and the direction of the curving determines whether the user input is a request to drilldown or drillup.

46. The computing device of claim 33 wherein the transition animation uses 3D or pseudo-3D effects.

47. The computing device of claim 33 wherein the transition animation further comprises an animation depicting a turning of a page.

48. The computing device of claim 33 wherein the transition animation further comprises an animation depicting a rotation of a box.

\* \* \* \* \*